United States Patent
Bateman et al.

(10) Patent No.: US 9,515,588 B2
(45) Date of Patent: Dec. 6, 2016

(54) SENSORLESS CONTROL OF A BRUSHLESS PERMANENT-MAGNET MOTOR

(71) Applicant: Dyson Technology Limited, Wiltshire (GB)

(72) Inventors: Christopher John Bateman, Malmesbury (GB); Barrie Charles Mecrow, Newcastle Upon Tyne (GB)

(73) Assignee: DYSON TECHNOLOGY LIMITED, Wiltshire (GB)

( * ) Notice: Subject to any disclaimer, the term of this patent is extended or adjusted under 35 U.S.C. 154(b) by 363 days.

(21) Appl. No.: 13/786,119

(22) Filed: Mar. 5, 2013

(65) Prior Publication Data

US 2013/0234640 A1    Sep. 12, 2013

(30) Foreign Application Priority Data

Mar. 6, 2012   (GB) .................................. 1203911.1
Jun. 12, 2012  (GB) .................................. 1210371.9

(51) Int. Cl.
*H02P 6/00*  (2016.01)
*H02P 6/18*  (2016.01)

(52) U.S. Cl.
CPC ............... *H02P 6/182* (2013.01); *H02P 6/26* (2016.02)

(58) Field of Classification Search
USPC ............... 318/400.35, 400.04, 599, 400.09, 400.12, 318/400.14, 400.29, 811, 400.11; 68/12.16, 68/12.19
See application file for complete search history.

(56) References Cited

U.S. PATENT DOCUMENTS

| | | | |
|---|---|---|---|
| 4,514,667 A | | 4/1985 | Sakmann et al. |
| 4,764,711 A | | 8/1988 | Deller |
| 4,922,169 A | * | 5/1990 | Freeman .................... 318/400.1 |
| 5,012,166 A | | 4/1991 | Ushijima et al. |
| 5,068,582 A | | 11/1991 | Scott |
| 5,115,174 A | * | 5/1992 | Masuda et al. .......... 318/400.06 |

(Continued)

FOREIGN PATENT DOCUMENTS

| EP | 0 251 785 | 1/1988 |
|---|---|---|
| GB | 2469126 | 10/2010 |

(Continued)

OTHER PUBLICATIONS

Search Report dated Jun. 28, 2012, directed to GB Application No. 1203911.1; 1 page.

(Continued)

*Primary Examiner* — Jorge L Carrasquillo
(74) *Attorney, Agent, or Firm* — Morrison & Foerster LLP

(57) ABSTRACT

A method of controlling a brushless permanent-magnet motor. The method includes generating a first signal having a voltage that is proportional to a voltage across a winding of the motor, and generating a second signal having a voltage that is proportional to a current in the winding. The second signal is then differentiated to generate a third signal, and the voltages of the first signal and the third signal are compared. An output signal is generated in response to the comparison, the output signal having an edge whenever the voltages of the first signal and the third signal correspond. The winding is then commutated at times relative to the edges in the output signal. Additionally, a control system that implements the method, and a motor system that incorporates the control system.

14 Claims, 12 Drawing Sheets

(56) References Cited

U.S. PATENT DOCUMENTS

| | | | |
|---|---|---|---|
| 5,467,025 A | 11/1995 | Ray | |
| 5,600,218 A | 2/1997 | Holling et al. | |
| 5,696,430 A * | 12/1997 | Erdman | F23N 3/082 318/400.34 |
| 5,982,571 A | 11/1999 | Calfee et al. | |
| 6,538,404 B2 * | 3/2003 | Kato | H02M 7/53871 318/139 |
| 7,158,329 B1 | 1/2007 | Ryan | |
| 7,622,880 B1 * | 11/2009 | Chui | G05B 19/416 318/400.32 |
| 2002/0033684 A1 | 3/2002 | Jensen et al. | |
| 2004/0257028 A1 | 12/2004 | Schulz et al. | |
| 2005/0151502 A1 | 7/2005 | Quirion | |
| 2005/0216225 A1 | 9/2005 | Anghel et al. | |
| 2005/0269982 A1 | 12/2005 | Coles et al. | |
| 2006/0132070 A1 | 6/2006 | Heydt et al. | |
| 2006/0176005 A1 | 8/2006 | Ta et al. | |
| 2007/0194730 A1 * | 8/2007 | Fukamizu | H02P 6/21 318/400.09 |
| 2007/0296371 A1 | 12/2007 | Aoki | |
| 2010/0251512 A1 * | 10/2010 | Clothier et al. | 15/412 |
| 2010/0253262 A1 | 10/2010 | Celik | |
| 2010/0256782 A1 | 10/2010 | Dai | |
| 2011/0254482 A1 * | 10/2011 | Dai | H02P 6/002 318/400.13 |
| 2011/0254488 A1 * | 10/2011 | Clothier et al. | 318/400.14 |
| 2012/0081050 A1 | 4/2012 | Dai | |
| 2012/0081064 A1 | 4/2012 | Leaver et al. | |
| 2012/0229264 A1 * | 9/2012 | Company Bosch | G06F 3/016 340/407.1 |
| 2013/0234631 A1 | 9/2013 | Bateman | |
| 2013/0234633 A1 | 9/2013 | Bateman | |

FOREIGN PATENT DOCUMENTS

| | | |
|---|---|---|
| GB | 2469140 | 10/2010 |
| GB | 2484779 | 4/2012 |
| JP | 63-148890 | 6/1988 |
| JP | 3-226292 | 10/1991 |
| JP | 7-177788 | 7/1995 |
| JP | 2001-231286 | 8/2001 |
| JP | 2007-170868 | 7/2007 |
| JP | 2007-336641 | 12/2007 |
| JP | 2009-124776 | 6/2009 |
| JP | 2010-88267 | 4/2010 |
| JP | 2011-229387 | 11/2011 |
| JP | 2012-10477 | 1/2012 |
| WO | WO-2008/003709 | 1/2008 |
| WO | WO-2010/046266 | 4/2010 |

OTHER PUBLICATIONS

Search Report dated Oct. 12, 2012, directed to GB Application No. 1210371.9; 1 page.

International Search Report and Written Opinion mailed Aug. 27, 2013, directed to International Application No. PCT/GB2013/050547; 9 pages.

* cited by examiner

| Control Signals | | | Power Switches | | | | Inverter Condition |
|---|---|---|---|---|---|---|---|
| DIR1 | DIR2 | FW# | Q1 | Q2 | Q3 | Q4 | |
| 0 | 0 | X | 0 | 0 | 0 | 0 | Off |
| 1 | 0 | 1 | 1 | 0 | 0 | 1 | Excite Left-to-Right |
| 0 | 1 | 1 | 0 | 1 | 1 | 0 | Excite Right-to-Left |
| 1 | 0 | 0 | 0 | 0 | 0 | 1 | Freewheel Left-to-Right |
| 0 | 1 | 0 | 0 | 0 | 1 | 0 | Freewheel Right-to-Left |
| 1 | 1 | X | - | - | - | - | Illegal |

Fig. 3

SENSORLESS CONTROL OF A BRUSHLESS PERMANENT-MAGNET MOTOR

REFERENCE TO RELATED APPLICATIONS

This application claims the priorities of United Kingdom Application No. 1203911.1, filed Mar. 6, 2012, and United Kingdom Application No. 1210371.9, filed Jun. 12, 2012, the entire contents of which are incorporated herein by reference.

FIELD OF THE INVENTION

The present invention relates to sensorless control of a brushless permanent-magnet motor.

BACKGROUND OF THE INVENTION

Knowledge of the rotor position is essential in order to commutate the phase windings of a brushless motor at the correct times. A permanent-magnet motor will often include a Hall-effect sensor, which outputs a signal indicative of the rotor position. Although the component cost of the sensor is relatively cheap, integrating the sensor within the motor often complicates the design and manufacture of the motor. Additionally, the signal output by the sensor is often susceptible to electromagnetic noise generated within the motor.

Sensorless schemes for determining indirectly the position of a rotor are known. For a permanent-magnet motor, transitions in the polarity of the back EMF induced in a phase winding may be used to determine the rotor position. For a multi-phase motor, the rotor position may be determined by sensing the back EMF induced in a non-excited phase winding. For a single-phase motor, the lack of additional phase windings makes this type of control unfeasible. Nevertheless, the position of the rotor may be determined by suspending excitation at points in the electrical cycle where transitions in the polarity of the back EMF are expected. Unfortunately, suspending excitation has the disadvantage of reducing the electrical power that can be driven into the motor.

SUMMARY OF THE INVENTION

In a first aspect, the present invention provides a method of controlling a brushless permanent-magnet motor, the method comprising generating a first signal having a voltage that is proportional to a voltage across a winding of the motor, generating a second signal having a voltage that is proportional to a current in the winding, differentiating the second signal to generate a third signal, comparing the voltages of the first signal and the third signal, generating an output signal in response to the comparison, wherein an edge is generated in the output signal when the voltages of the first signal and the third signal correspond, and commutating the winding at times relative to edges in the output signal.

The rotor of a permanent-magnet motor induces a back EMF in the winding. The magnitude of the back EMF depends on, among other things, the angular position of the rotor. The voltage equation for winding may be expressed as $V_{ph}=i_{ph}R_{ph}+L_{ph}di_{ph}/dt+E_{ph}$, where $V_{ph}$ is the voltage across the winding, $i_{ph}$ is the current in the winding, $R_{ph}$ is the resistance of the winding, $L_{ph}$ is the inductance of the winding, and $E_{ph}$ is the back EMF induced in the winding by the rotor. For a motor having a relatively small $i_{ph}R_{ph}$ term, the voltage equation reduces to $V_{ph}=L_{ph}di_{ph}/dt+E_{ph}$. The voltage of the first signal is proportional to $V_{ph}$, and the voltage of the third signal is proportional to $L_{ph}di_{ph}/dt$. An edge is therefore generated in the output signal whenever the back EMF has a given value, which depends on how the voltages of the two signals are scaled. Since the magnitude of the back EMF depends on the angular position of the rotor, an edge is generated in the output signal when the rotor is at a predetermined position. Accordingly, the position of the rotor may be determined without the need for a Hall-effect sensor.

The voltage equation holds true irrespective of the voltage across the winding. Consequently, the position of the rotor may be determined during excitation of the winding. It is therefore possible to both drive the motor and determine the position of the rotor using a single winding. The method does not require phase excitation to be suspended in order to determine the rotor position. Accordingly, in comparison to existing methods for sensorless control of a single-phase motor, more electrical power may be driven into the motor over each electrical half-cycle.

Zero-crossings in the back EMF occur when the rotor is at an aligned or unaligned position. At zero-crossings in the back EMF, the voltage equation further reduces to $V_{ph}=L_{ph}di_{ph}/dt$. The first and third voltages of the first and third signals may therefore correspond in response to each zero-crossing in the back EMF. As a result, an edge is generated in the output signal whenever the rotor is at an aligned or unaligned position.

On commutating the winding, the direction of current through the winding is made to reverse. However, owing to the inductance of the winding, there is often a short period during which the current continues to flow in the same direction. Depending on how the current is sensed, the current may appear to undergo an abrupt change in polarity in response to commutation. As a result, a spike is created in the voltage of the third signal. It is therefore possible that the voltages of the first signal and the third signal may correspond in response to commutating the winding. Accordingly, the method may comprise ignoring edges in response to commutating the winding.

The method may comprise exciting and freewheeling the winding. It may not be possible to sense the current in the winding during freewheeling. As a result, the voltage of the second signal will be invalid, i.e. the voltage will no longer be proportional to the magnitude of current in the winding. This in turn may lead to spurious edges in the output signal. Accordingly, the method may comprise commutating the winding at times relative to edges generated during excitation, and ignoring edges generated during freewheeling. This then prevents the winding from being commutated at incorrect times during to spurious edges in the output signal.

It may be possible to measure the voltage across the winding and the current in the winding during both excitation and freewheeling. That is to say that the method may comprise generating the first and second signals during both excitation and freewheeling. The method may then comprise commutating the winding at times relative to edges generated during excitation or freewheeling. This then has the advantage that the rotor position can be determined during either excitation or freewheeling. As a result, advanced, synchronous or retarded commutation may be employed.

The method may comprise exciting the winding with an excitation voltage, and generating a first signal having a voltage that is proportional to the excitation voltage. As a consequence, the voltage of the first signal is proportional to the voltage across the winding during excitation only, i.e. the rotor position may be determined during excitation only.

Nevertheless, this offers a relatively simple method for obtaining a measure of the voltage across the winding. In particular, a single potential divider may be used to generate the first signal.

In a second aspect, the present invention provides a control system for a brushless permanent-magnet motor, the control system performing a method as claimed in any one of the preceding paragraphs.

In a third aspect, the present invention provides a control system for a brushless permanent-magnet motor, the control system comprising a first sensor generating a first signal having a voltage that is proportional to a voltage across a winding of the motor, a second sensor generating a second signal having a voltage that is proportional to a current in the winding, a differentiator differentiating the second signal and generating in response a third signal, a comparator comparing the voltages of the first signal and the third signal and generating in response an output signal, wherein an edge is generated in the output signal when the voltages of the first signal and the third signal correspond, and a controller generating one or more control signals for commutating the winding at times relative to edges in the output signal.

As noted above, the voltage equation for the winding may be expressed as $V_{ph}=L_{ph}di_{ph}/dt+E_{ph}$. The voltage of the first signal is proportional to $V_{ph}$, and the voltage of the third signal is proportional to $L_{ph}di_{ph}/dt$. An edge is therefore generated in the output signal whenever the back EMF has a given value, which depends on how the voltages of the two signals are scaled. Since the magnitude of the back EMF depends on the angular position of the rotor, an edge is generated in the output signal when the rotor is at a predetermined position. Accordingly, the position of the rotor may be determined without the need for a Hall-effect sensor.

The voltages of the first signal and the third signal may correspond in response to a zero-crossing in back EMF induced in the winding. An edge is then generated in the output signal whenever the rotor is at an aligned or unaligned position.

The first sensor and the second sensor may generate signals having voltages that are appropriately scaled such that the voltages of the first and third signals correspond at zero-crossings in the back EMF. Alternatively, scaling of at least one of the first signal, the second signal and the third signal may be required in order to ensure that the voltages of the first and third signals correspond. Accordingly, the control system may comprise a voltage scaler scaling at least one of the first signal, the second signal and the third signal such that the voltages of the first signal and the third signal correspond in response to a zero-crossing in back EMF induced in the winding. The voltage scaler may take the form of, for example, an amplifier or attenuator.

As noted above, it is possible that the voltages of the first signal and the third signal will correspond in response to commutating the winding. Accordingly, the controller may ignores edges generated in response to commutating the winding.

The controller may generate control signals for exciting and freewheeling the winding. During freewheeling, it may not be possible for the second sensor to sense the current in the winding. Accordingly, the controller may generate control signals for commutating the winding in response to edges generated during excitation and ignores edges generated during freewheeling. This then prevents the winding from being commutated at incorrect times during to spurious edges in the output signal.

The control system may comprise an inverter to which the winding is coupled. The first sensor may then comprise a single potential divider located across the inverter. As a consequence, the voltage of the first signal is proportional to the voltage across the winding during excitation only, i.e. the rotor position may be determined during excitation only. Nevertheless, a single potential divider offers a relatively simple and cost-effective means for obtaining a measure of the voltage across the winding. Alternatively, the first sensor may comprise a pair of potential dividers located on opposite sides of the winding, and the second sensor may comprise one of a current transducer, a current transformer and a pair of sense resistors located on opposite arms of the inverter. As a result, the voltage across the winding and the current in the winding may be sensed during both excitation and freewheeling. This then has the advantage that it is possible to determine the rotor position during both excitation and freewheeling. Consequently, advanced, synchronous or retarded commutation may be employed.

In a fourth aspect, the present invention provides a motor system comprising a brushless permanent-magnet motor and a control system according to the preceding paragraph.

The motor may comprise a single phase winding. This then has the advantage of simplifying the control system necessary to drive the motor. The control system is able to sense the position of the rotor during excitation of the winding. Accordingly, sensorless control of a single-phase motor may be achieved without compromising on electrical power.

BRIEF DESCRIPTION OF THE DRAWINGS

In order that the present invention may be more readily understood, embodiments of the invention will now be described, by way of example, with reference to the accompanying drawings, in which:

FIG. 3 details the allowed states of the inverter in response to control signals issued by the controller of the motor system;

DETAILED DESCRIPTION OF THE INVENTION

Figure 1:
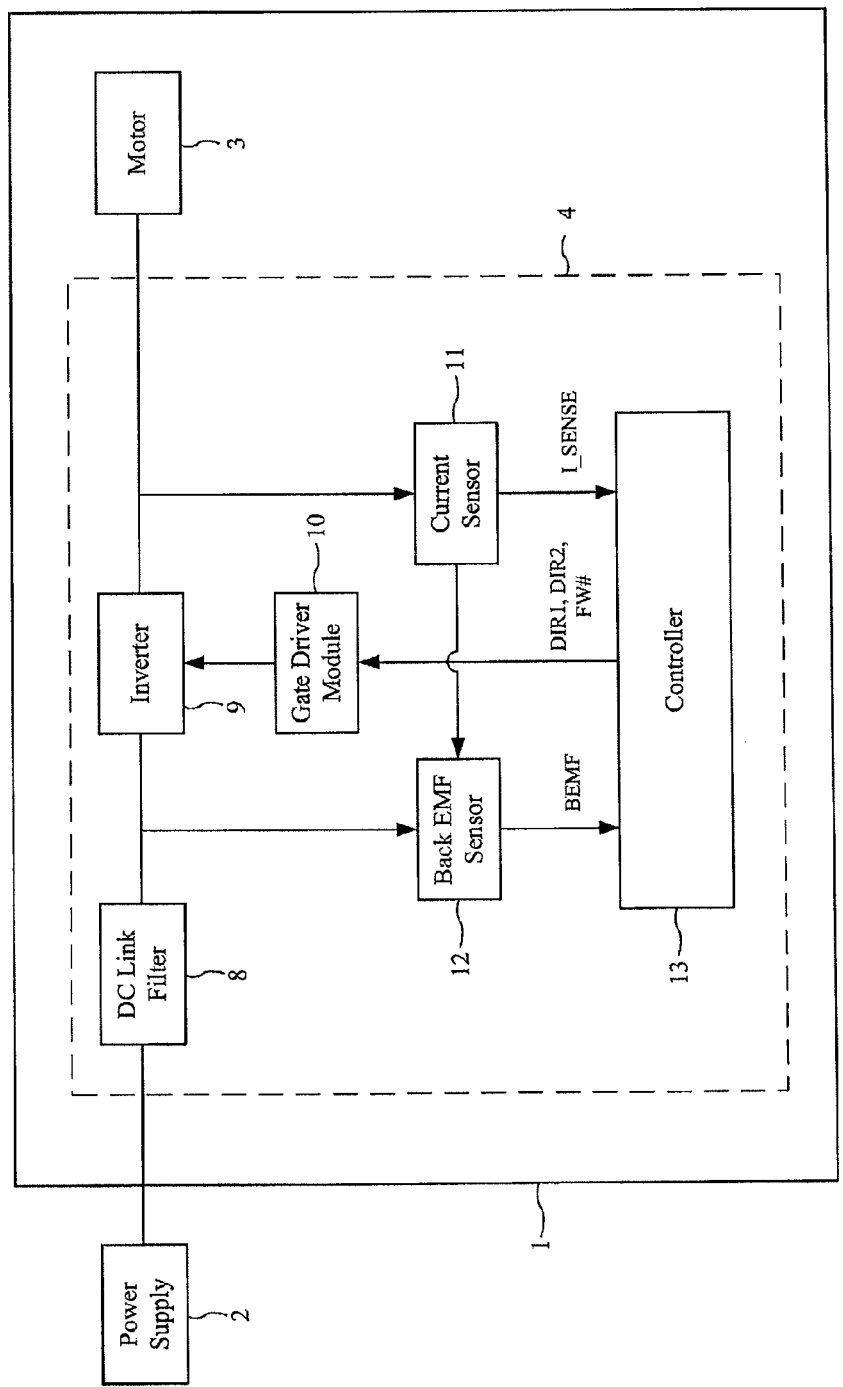
FIG. 1 is a block diagram of a motor system in accordance with the present invention.
Figure 2:
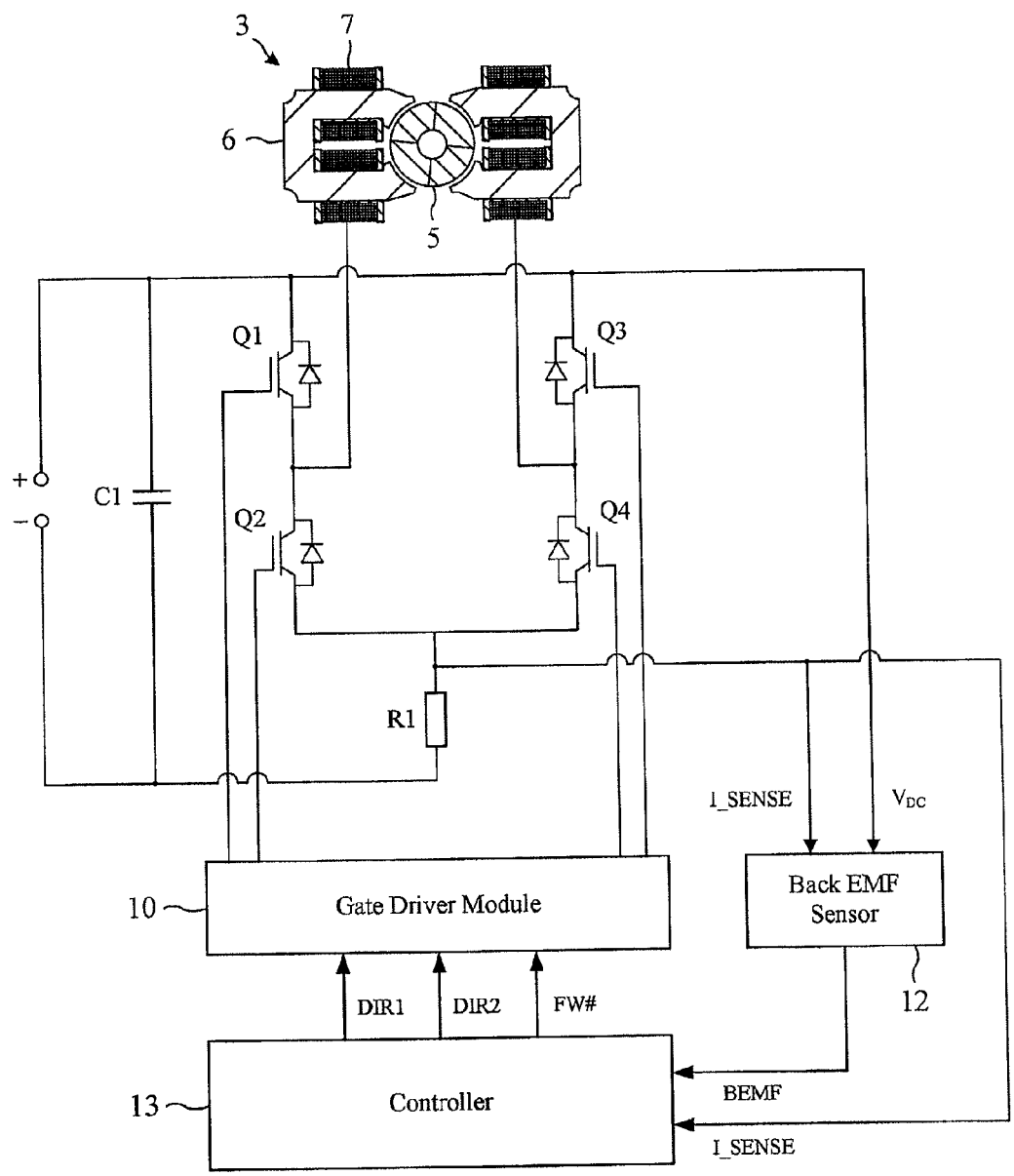
FIG. 2 is a schematic diagram of the motor system.

The motor system 1 of FIGS. 1 and 2 is powered by a DC power supply 2 and comprises a brushless motor 3 and a control system 4.

The motor 3 comprises a four-pole permanent-magnet rotor 5 that rotates relative to a four-pole stator 6. Conductive wires are wound about the stator 6 and are coupled together (e.g. in series or parallel) to form a single phase winding 7.

The control system 4 comprises a DC link filter 8, an inverter 9, a gate driver module 10, a current sensor 11, a back EMF sensor 12, and a controller 13.

The DC link filter 8 comprises a capacitor C1 that smoothes the relatively high-frequency ripple that arises from switching of the inverter 9.

The inverter 9 comprises a full bridge of four power switches Q1-Q4 that couple the DC link voltage to the phase winding 7. Each of the switches Q1-Q4 includes a freewheel diode.

The gate driver module 10 drives the opening and closing of the switches Q1-Q4 in response to control signals received from the controller 13.

The current sensor 11 comprises a sense resistor R1 located on the negative rail of the inverter 9. The voltage across the current sensor 11 provides a measure of the current in the phase winding 7 when connected to the power supply 2. The voltage across the current sensor 11 is output to the back EMF sensor 12 and the controller 13 as a current sense signal, I_SENSE.

The back EMF sensor 12 generates a digital signal, BEMF, which is output to the controller 13. A more detailed description of the back EMF sensor 12 is provided below in the section entitled Steady-State Mode.

The controller 13 comprises a microcontroller having a processor, a memory device, and a plurality of peripherals (e.g. ADC, comparators, timers etc.). The memory device stores instructions for execution by the processor, as well as control parameters (e.g. current limit, rise-time threshold, speed threshold, freewheel period, advance period, conduction period, etc.) for use by the processor. The controller 13 is responsible for controlling the operation of the motor system 1 and generates three control signals: DIR1, DIR2, and FW#. The control signals are output to the gate driver module 10, which in response drives the opening and closing of the switches Q1-Q4 of the inverter 9.

DIR1 and DIR2 control the direction of current through the inverter 9 and thus through the phase winding 7. When DIR1 is pulled logically high and DIR2 is pulled logically low, the gate driver module 10 closes switches Q1 and Q4, and opens switches Q2 and Q3, thus causing current to be driven through the phase winding 7 from left to right. Conversely, when DIR2 is pulled logically high and DIR1 is pulled logically low, the gate driver module 10 closes switches Q2 and Q3, and opens switches Q1 and Q4, thus causing current to be driven through the phase winding 7 from right to left. Current in the phase winding 7 is therefore commutated by reversing DIR1 and DIR2. If both DIR1 and DIR2 are pulled logically low, the gate drive module 10 opens all switches Q1-Q4.

FW# is used to disconnect the phase winding 7 from the DC link voltage and allow current in the phase winding 7 to freewheel around the low-side loop of the inverter 9. Accordingly, in response to a FW# signal that is pulled logically low, the gate driver module 10 causes both high-side switches Q1,Q3 to open.

Each power switch Q1-Q4 conducts in a single direction only. Consequently, current freewheels through one of the low-side switches Q2,Q4 and through a freewheel diode of the other low-side switch Q2,Q4. Certain types of power switch (e.g. MOSFETs) are capable of conducting in both directions. Accordingly, rather than freewheeling through a freewheel diode, both low-side switches Q2,Q4 may be closed such that current freewheels through both low-side switches Q2,Q4, i.e. in addition to opening both high-side switches Q1,Q3, both low-side switches Q2,Q4 are closed in response to a logically low FW# signal.

FIG. 3 summarises the allowed states of the switches Q1-Q4 in response to the control signals of the controller 13. Hereafter, the terms 'set' and 'clear' will be used to indicate that a signal has been pulled logically high and low respectively.

Excessive currents may damage components of the control system 4 (e.g. the power switches Q1-Q4) and/or demagnetise the rotor 5. The controller 13 therefore monitors the current sense signal, I_SENSE, during excitation of the phase winding 7. In the event that current in the phase winding 7 exceeds a current limit, the controller 13 freewheels the phase winding 7 by clearing FW#. Freewheeling continues for a freewheel period, during which time current in the phase winding 7 falls to a level below the current limit. At the end of the freewheel period, the controller 13 again excites the phase winding 7 by setting FW#. As a result, current in the phase winding 7 is chopped at the current limit.

The controller 13 operates in one of three modes depending on the speed of the rotor 5. When the rotor 5 is stationary, the controller 13 operates in start-up mode, which is employed merely to start the rotor 5 moving in a forward direction. Once the rotor 5 is moving forwards, the controller 13 switches to acceleration mode. The controller 13 operates in acceleration mode until the speed of the rotor 5 exceeds a speed threshold, after which the controller 13 switches to steady-state mode. Within each mode of operation, the controller 13 employs a different scheme to control the motor 3 without the need for a dedicated rotor sensor.

Start-Up Mode

The controller 13 makes no attempt to determine the position of the rotor 5 when operating in start-up mode. Instead, the controller 13 excites the phase winding 7 in a predetermined sequence that ensures that, irrespective of the position in which the rotor 5 has parked, the rotor 5 is driven in a forwards direction.

The controller 13 begins by exciting the phase winding 7 in a particular direction for a predetermined period of time. The choice of direction is unimportant. So, for example, the controller 13 might set DIR1 and clear DIR2 so as to excite the phase winding 7 from left to right.

The air gap between the poles of the stator 6 and the rotor 5 is asymmetric. As a result, the rotor 5 parks in a position for which the rotor poles are misaligned slightly relative to the stator poles. The rotor 5 parks in one of two positions relative to the applied stator field. In a first position, the rotor 5 is approximately aligned with the applied stator field. In a second position, the rotor 5 is approximately unaligned with the applied stator field. When parked in the first position, the rotor 5 rotates backwards in response to excitation of the phase winding 7. The rotor 5 rotates through a relatively small angle until the rotor 5 adopts the fully aligned position. When parked in the second position, the rotor 5 rotates forwards in response to excitation of the phase winding 7. The rotor 5 rotates through a larger angle until the rotor 5 is again in the fully aligned position. Accordingly, irrespective of the position at which the rotor 5 has parked, the excitation of the phase winding 7 causes the rotor 5 to move to the aligned position. The predetermined period over which the phase winding 7 is excited ensures that the rotor 5 moves from either parking position to the aligned position.

After exciting the phase winding 7 for the predetermined period, the controller 13 turns off the phase winding 7 by clearing both DIR1 and DIR2. By suspending phase excitation, the rotor 5 rotates forwards through a small angle such that the rotor 5 adopts the first parking position. Phase excitation is suspended for a period sufficient to ensure that the rotor 5 has come to a rest at the first parking position. The controller 13 then excites the phase winding 7 in the opposite direction to that previously employed. So, for example, the controller 13 might set DIR2 and clear DIR1 so as to excite the phase winding 7 from right to left. This then causes the rotor 5 to be driven forwards. At this stage, the controller 13 switches to acceleration mode.

Acceleration Mode

When operating in acceleration mode, the controller 13 employs a first sensorless scheme for determining the position of the rotor 5.

On entering acceleration mode, the controller 13 is already exciting the phase winding 7. As noted above, the controller 13 employs a current-control scheme in which the phase winding 7 is freewheeled whenever current in the winding 7 exceeds a current limit. The controller 13 freewheels the phase winding 7 for a predetermined freewheel period. At the end of the freewheel period, the controller 13 again excites the phase winding 7. The controller 13 therefore sequentially excites and freewheels the phase winding 7 over each electrical half-cycle.

The back EMF induced in the phase winding 7 influences the rate at which current in the phase winding 7 rises during excitation and falls during freewheeling. In particular, as the back EMF increases, current in the phase winding 7 rises at a slower rate and falls at a faster rate. Consequently, as the rotor 5 rotates, the phase current falls to a different level during each freewheel period. The phase current therefore starts from a different level and rises at a different rate during each period of excitation. The applicant has found that the time taken for the phase current to rise to the current limit during each period of excitation depends on the angular position of the rotor 5. Moreover, the current-rise period decreases as the rotor 5 approaches an aligned position. This finding is then exploited by the controller 13 in order to determine the position of the rotor 5.

At the end of each freewheel period, the controller 13 starts a timer. When the phase current subsequently exceeds the current limit, the controller 13 stops the timer. The controller 13 then compares the current-rise period stored by the timer against a predetermined rise-time threshold. If the current-rise period is less than the rise-time threshold, the controller 13 determines that the rotor 5 is at an aligned position.

When operating in acceleration mode, the controller 13 commutates the phase winding 7 in synchrony with each determined aligned position. Accordingly, in response to determining that the rotor 5 is at an aligned position, the controller 13 immediately commutates the phase winding 7 (i.e. by reversing DIR1 and DIR2, and setting FW#). However, if required, the controller 13 might alternatively commutate the phase winding 7 before or after the determined aligned position. A scheme for commutating the phase winding 7 at different times relative to the determined aligned position is described below in the section entitled Steady-State Mode.

Figure 4:
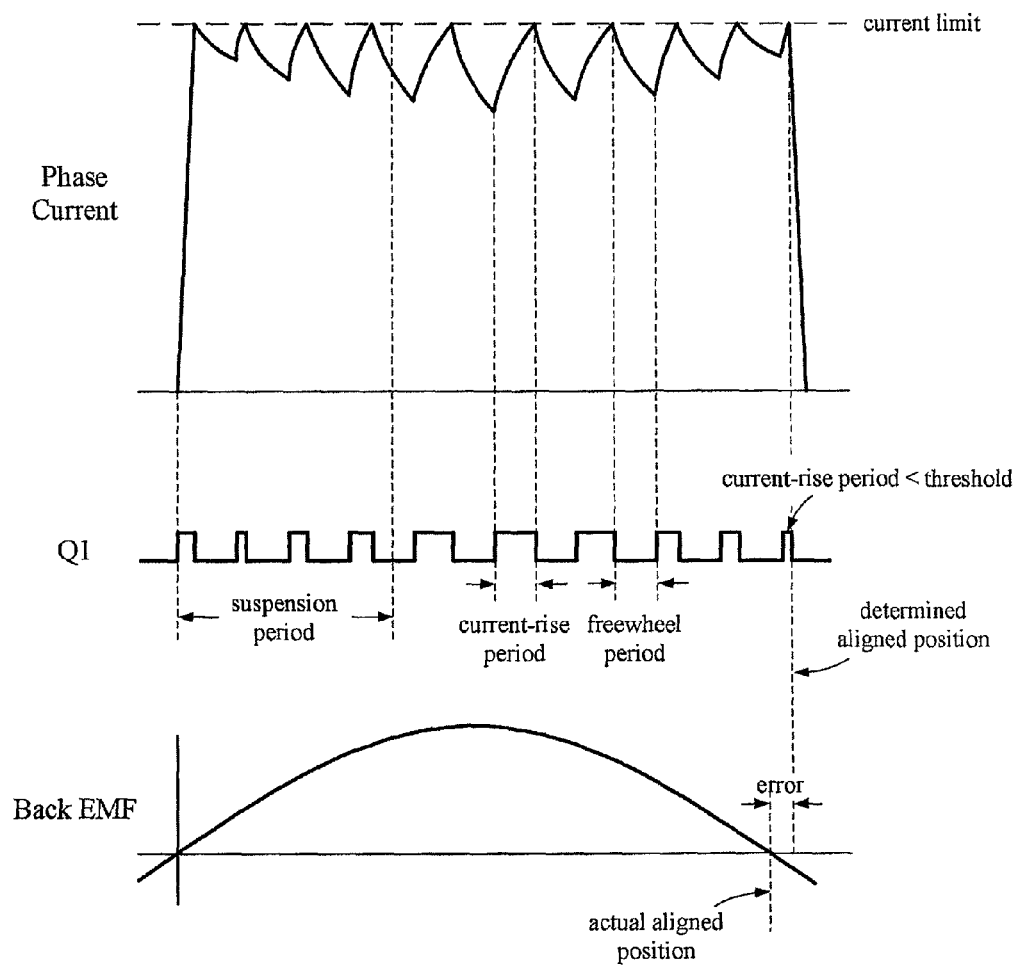
FIG. 4 illustrates various waveforms of the motor system when operating at a relatively low speed within acceleration mode.
Figure 5:
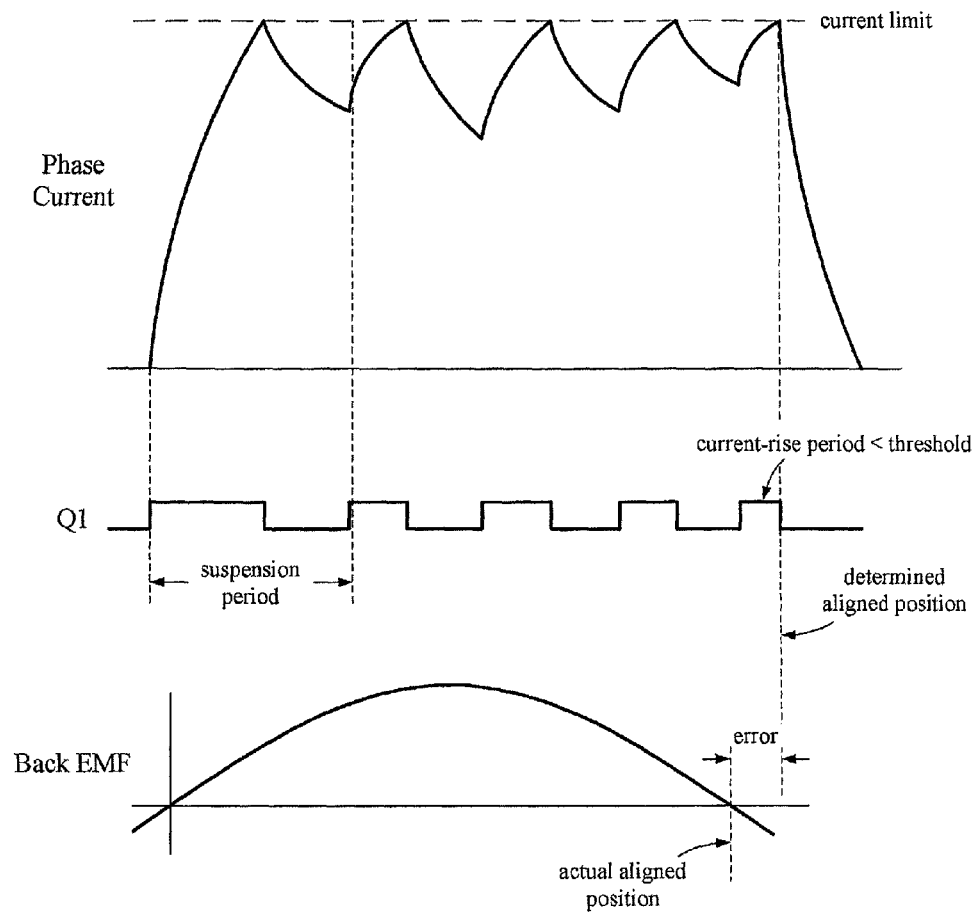
FIG. 5 illustrates various waveforms of the motor system when operating at a relatively high speed within acceleration mode.

The controller 13 assesses the position of the rotor 5 with each current chop. Consequently, the frequency of current chopping defines the resolution with which the aligned position of the rotor 5 is determined. At relatively low rotor speeds, the length of each electrical half-cycle is relatively long and the magnitude of the back EMF is relatively small. As a result, the controller 13 typically chops the phase current many times over each electrical half-cycle and thus the aligned position of the rotor 5 may be determined with relatively good accuracy. As the speed of the rotor 5 increases, the length of each electrical half-cycle decreases and the magnitude of the back EMF increases. The controller 13 therefore chops the phase current less frequently and thus the margin of error in the aligned position determined by the controller 13 increases. By way of example, FIG. 4 illustrates waveforms for the phase current, the on/off signal for power switch Q1, and the back EMF over one electrical half-cycle when operating at a relatively low rotor speed. FIG. 5 then illustrates the same waveforms when operating at a relatively high rotor speed. It can be seen that the error in the determined aligned position (i.e. the difference between the actual aligned position and the aligned position determined by the controller 13) is greater at the higher speed.

Owing to the behaviour identified in the previous paragraph, the value chosen for the rise-time threshold influences the accuracy of the determined aligned position. For example, if the rise-time threshold is set too high, the controller 13 is likely to determine an aligned position for the rotor 5 at an earlier point, particularly when operating at lower speeds. Conversely, if the rise-time threshold is set too low, the controller 13 is likely to determine an aligned position for the rotor 5 at a later point, particularly when operating at higher speeds. Since the phase winding 7 is commutated at a time relative to the determined aligned position, the accuracy of the determined aligned position influences the power and/or the efficiency of the motor system 1.

In order to improve the accuracy of the determined aligned position, the controller 13 may employ a rise-time threshold that varies with rotor speed. In particular, the controller 13 may employ a rise-time threshold that increases with increasing rotor speed. Consequently, at lower speeds, where the frequency of current chopping is relatively high, a lower rise-time threshold may be used. Conversely, at higher speeds, where the frequency of current chopping is relatively low, a higher rise-time threshold may be used. As a result, the aligned position may be determined with improved accuracy over a range of rotor speeds.

The accuracy of the determined aligned position may also be improved by decreasing the freewheel period. As the freewheel period decreases, the frequency of current chopping increases and thus the aligned position may be determined with improved accuracy. The minimum permissible freewheel period is likely to be dictated by the speed of the hardware (e.g. the speed of the controller 13 and the maximum switching frequency of the power switches Q1-Q4) as well as the characteristics of the motor 3 (e.g. the resistance and inductance of the phase winding 7, and the shape and magnitude of the back EMF).

Rather than employing a fixed freewheel period, it may be desirable to vary the freewheel period in response to changes in the rotor speed. For example, a longer freewheel period may be employed at lower speeds so as to minimise switching losses, and a shorter freewheel period may be employed at higher speeds so as to increase the frequency of current chopping and thus improve the accuracy of the aligned position.

The time spent in acceleration mode may be relatively short and therefore the power and/or efficiency of the motor system 1 when operating in acceleration mode may be unimportant. Consequently, in spite of the advantages that arise when employing speed dependent values for the rise-time threshold and/or the freewheel period, fixed values may nevertheless be employed. Indeed, employing fixed values for the rise-time threshold and/or freewheel period has the advantage of simplifying the control scheme.

The controller 13 determines the speed of the rotor 5 by measuring the interval between two successive aligned positions, as determined by the controller 13. As noted above, there is a margin of error associated with each aligned position determined by the controller 13. Accordingly, in order to obtain a more accurate measure of the rotor speed, the controller 13 may measure the average interval for a plurality of determined aligned positions. For example, the controller 13 may determine the rotor speed by averaging the interval over four successive aligned positions.

Immediately after the controller 13 has determined that the rotor 5 is at an aligned position, the position of the rotor 5 may still be at or near the aligned position. Consequently, if the controller 13 were to continue measuring and comparing the current-rise period, further aligned positions may be determined for the same actual aligned position. This is particularly true at lower rotor speeds, where the magnitude of the back EMF is relatively small and thus the rate at which phase current rises during excitation is relatively fast. The controller 13 therefore suspends measuring the current-rise period for a predetermined period of time after determining that the rotor 5 is at the aligned position. This period will hereafter be referred to as the suspension period. The suspension period is of a length that ensures that the rotor 5 is no longer at or near the aligned position at the end of suspension period. For example, the suspension period may be set such that, over the full speed range within acceleration mode, the rotor 5 rotates through at least 70 electrical degrees during the suspension period.

As the speed of the rotor 5 increases, the length of each electrical half-cycle decreases. Consequently, a fixed suspension period may be unsuitable, particularly when the speed range is relatively large. For example, the speed range when operating in acceleration mode may be 1,000 to 50,000 rpm. At 1,000 rpm, the period of an electrical half-cycle for the four-pole motor is 15 ms. A suspension period of 5.8 ms would therefore correspond to an electrical angle of about 70 degrees. At 50,000 rpm, the period of an electrical half-cycle is 0.3 ms. A suspension period of 5.8 ms is therefore clearly unsuitable at this speed. Accordingly, the controller 13 may employ a suspension period that varies with rotor speed. In particular, the controller 13 may employ a suspension period that decreases with increasing rotor speed.

In the scheme described above, the current-rise period starts at the end of the freewheel period. As a result, a single timer may be used for both the current-rise period and the freewheel period. Nevertheless, since the freewheel period is predetermined, the current-rise period might alternatively start at the beginning of the freewheel period. Accordingly, in a more general sense, the current-rise period may be said to be the interval between the start or end of freewheeling and the point in time at which current in the winding exceeds the current limit.

As the rotor speed increases, the period of each electrical half-cycle decreases and thus the time constant (L/R) associated with the phase inductance becomes increasingly important. Additionally, the back EMF induced in the phase winding 7 increases, which in turn influences the rate at which current rises in the phase winding 7. It therefore becomes increasingly difficult to drive current into the phase winding 7. At relatively high rotor speeds, the controller 13 may chop the phase current just once or twice during each electrical half-cycle. As a result, the margin of error in the aligned position determined by the controller 13 may be relatively large. The magnitude of the error may adversely affect the power and/or efficiency of the motor system 1. Moreover, the error may prevent further acceleration of the motor 3. Accordingly, the controller 13 switches from acceleration mode to steady-state mode when the speed of the rotor 5 exceeds a speed threshold.

Steady-State Mode

When operating in steady-state mode, the controller 13 employs a second sensorless scheme for determining the position of the rotor 5.

The second sensorless scheme makes use of the back EMF sensor 12. As will now be explained, the back EMF sensor 12 outputs a digital signal for which certain edges correspond to aligned positions of the rotor 5.

In the absence of any significant saturation or saliency, the voltage equation for the phase winding 7 may be expressed as:

$$V_{ph}=i_{ph}R_{ph}+L_{ph}\cdot di_{ph}/dt+E_{ph}$$

where $V_{ph}$ is the voltage across the phase winding 7, $i_{ph}$ is the current in the phase winding 7, $R_{ph}$ is the resistance of the phase winding 7, $L_{ph}$ is the inductance of the phase winding 7, and $E_{ph}$ is the back EMF induced in the phase winding 7 by the rotor 5.

When the rotor 5 is at an aligned position, the back EMF induced in the phase winding 7 is zero. At each zero-crossing in the back EMF, the voltage equation becomes:

$$V_{ph}=i_{ph}R_{ph}+L_{ph}\cdot di_{ph}/dt$$

For reasons that are set out below, the $i_{ph}R_{ph}$ term is negligible around zero-crossings in the back EMF. Consequently, for each aligned position of the rotor 5, the voltage equation reduces to:

$$V_{ph}=L_{ph}\cdot di_{ph}/dt$$

The back EMF sensor 12 makes use of this equation to generate an output signal having edges that correspond to aligned positions of the rotor 5.

Figure 6:
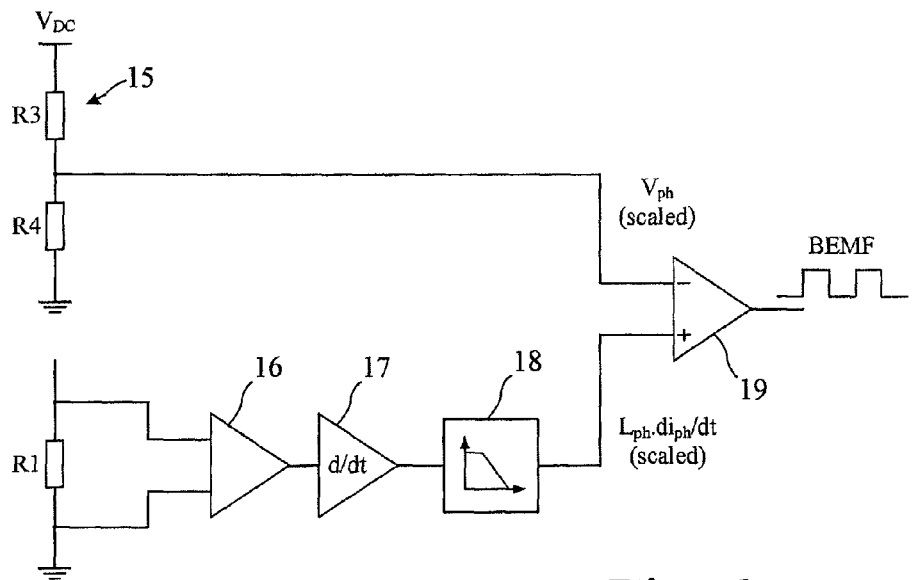
FIG. 6 is a schematic diagram of the back EMF sensor of the motor system.

As illustrated in FIG. 6, the back EMF sensor 12 comprises a voltage sensor 15, an amplifier 16, a differentiator 17, a low-pass filter 18, and a comparator 19.

The voltage sensor 15 comprises a potential divider R3,R4 that outputs a first signal having a voltage that is proportional to the DC link voltage, $V_{DC}$. When the phase winding 7 is excited, the voltage across the phase winding, $V_{ph}$, corresponds to the DC link voltage, $V_{DC}$, minus the voltage drop across the power switches Q1-Q4. Consequently, the first signal output by the voltage sensor 15 has a voltage that is proportional to that across the phase winding, $V_{ph}$, during excitation.

The amplifier 16 operates on the I_SENSE signal output by the current sensor 11. The differentiator 17 then operates on the signal output of the amplifier 16, and the low-pass filter 18 operates on the signal output by the differentiator 17. The current sensor 11 may be said to output a second signal having a voltage that is proportional to current in the phase winding 7. The differentiator 17 then differentiates the second signal and generates in response a third signal having a voltage that is proportional to the rate of change of current in the phase winding, $di_{ph}/dt$. The inductance of the phase winding 7 is assumed to be constant (this is valid when the motor 3 has little or no saliency and saturation effects are minimal) and thus the voltage of the third signal is proportional to $L_{ph} \cdot di_{ph}/dt$.

The low-pass filter 18 is employed merely to suppress any noise that may have been introduced into the third signal by the differentiator 17. If noise is not regarded as a problem then the filter 18 may be omitted. In FIG. 6, the low-pass filter 18 and the differentiator 17 are shown as two distinct components. Alternatively, the low-pass filter 18 may be implemented as part of the differentiator 17, thus avoiding the need for an additional operational amplifier.

The amplifier 16 ensures that the voltages of the first signal and the third signal are scaled appropriately such that the voltages of the two signals correspond when the back EMF induced in the phase winding 7 is zero, i.e. the voltages correspond when $V_{ph} = L_{ph} \cdot di_{ph}/dt$. Conceivably, the sense resistor R1 of the current sensor 11 and the potential divider R3,R4 of the voltage sensor 15 may be configured such that the voltages of the first signal and the second signal are already scaled appropriately, thereby avoiding the need for the amplifier 16. Alternatively, rather than an amplifier 16 operating on the second signal, a voltage scaler (e.g. amplifier or attenuator) may be used to scale one or more of the first signal, the second signal and the third signal such that the voltages of the first signal and the third signal correspond when the back EMF is zero.

The comparator 19 compares the voltages of the first and third signals and generates a digital output signal in response to the comparison. The output signal is logically high (or alternatively logically low) when the voltage of the first signal is greater than the voltage of the second signal (i.e. when $V_{ph} > L_{ph} \cdot di_{ph}/dt$), and logically low (or alternatively logically high) when the voltage of the first signal is lower than the voltage of the second signal (i.e. when $V_{ph} < L_{ph} \cdot di_{ph}/dt$). An edge is therefore generated in the output signal whenever the voltages of the two signals correspond, i.e. whenever $V_{ph} = L_{ph} \cdot di_{ph}/dt$. This condition is satisfied when the back EMF induced in the phase winding 7 is zero. Consequently, an edge is generated in the output signal when the rotor 5 is at an aligned position. However, as will now be explained, other edges are generated in the output signal that do not correspond to aligned positions of the rotor 5 and must therefore be ignored.

When operating in acceleration mode, the controller 13 sequentially excites and freewheels the phase winding 7 over the full length of each electrical half-cycle. In contrast, when operating in steady-state mode, the controller 13 sequentially excites and freewheels the phase winding 7 over a conduction period that spans only part of each electrical half-cycle. At the end of the conduction period, the controller 13 freewheels the phase winding 7 by clearing FW#. Freewheeling then continues indefinitely until such time as the controller 13 commutates the phase winding 7. Within the region of falling back EMF, less torque is achieved for a given phase current. Consequently, by freewheeling the phase winding 7 within this region, a more efficient motor system 1 may be realised. Additionally, as the back EMF falls, the phase current may rise sharply to an undesirable level. By freewheeling the phase winding 7 in the region of falling back EMF, such current spikes may be avoided.

When operating in steady-state mode, the controller 13 commutates the phase winding 7 in advance of each aligned position of the rotor 5; the reasons for this are explained below. As noted in the previous paragraph, the phase winding 7 is freewheeling immediately prior to commutation. During freewheeling, the phase current circulates around the low-side loop of the inverter 9 and bypasses the current sensor 11. Consequently, no current passes through the current sensor 11 and thus the voltage of the second signal is zero. In contrast, the current flowing through the phase winding 7 is non-zero and may be relatively large. Accordingly, on commutating the phase winding 7, there is a sudden change in the magnitude of the current through the current sensor 11. Additionally, on commutating the phase winding 7, the polarity of the current through the current sensor 11 is initially negative, owing to the inductance of the phase winding 7. The current then rises sharply and quickly becomes positive. Accordingly, on commutating the phase winding 7, the voltage of the second signal output by the current sensor 11 changes abruptly from zero to a negative value, and then rises sharply to a positive value. As a result, the voltage of the third signal output by the differentiator 17 has a negative spike (due to the abrupt change in the voltage of the second signal from zero to a negative value) immediately followed by a positive spike (due to the sharp rise in the voltage of the second signal). Owing to the positive spike in the voltage of the third signal, an edge is generated in the BEMF signal. However, this edge does not correspond to a zero-crossing in the back EMF. Instead, the edge is an artefact of the abrupt change in current through the current sensor 11, which arises because the current sensor 11 is not able to sense the phase current during freewheeling.

As noted in the previous paragraph, current in the phase winding 7 rises relatively quickly upon commutation. As a result, the voltage of the third signal is relatively high and exceeds that of the first signal. However, as the back EMF decreases, crosses zero, and then opposes the DC link voltage, the rate of current rise decreases and thus the voltage of the third signal decreases. At some point, the voltage of the third signal corresponds to that of the first signal and a further edge is generated in the BEMF signal. This edge then corresponds to a zero-crossing in the back EMF.

Consequently, on commutating the phase winding 7, a first edge is generated in the BEMF signal due to the abrupt change in current through the current sensor 11. This is then followed by a second edge in the BEMF signal due to the zero-crossing in the back EMF. The controller 13 therefore ignores the first edge and determines that the rotor 5 is at an aligned position in response to the second edge.

In response to detecting the second edge, the controller 13 ignores the BEMF signal until such time as the controller 13 again commutates the phase winding 7. The reasons for this are as follows. As in acceleration mode, the controller 13 freewheels the phase winding 7 for a predetermined freewheel period whenever current in the phase winding 7 exceeds the current limit. Accordingly, during each conduction period, the controller 13 may chop the phase current. Should current chopping occur, the current through the current sensor 11 will change abruptly as the controller 13 freewheels and then excites the phase winding 7. Any abrupt changes in the current through the sensor 11 may result in spurious edges in the BEMF signal. Additionally, during any freewheel period, the phase current circulates around the low-side loop of the inverter 9 and bypasses the current sensor 11. Consequently, the voltage of the second signal output by the current sensor 11 is zero, and thus the third signal output by the differentiator 17 is invalid. The controller 13 therefore begins to monitor the BEMF signal only in response to commutating the phase winding 7. The controller 13 then ignores the first edge in the BEMF signal and determines that the rotor 5 is at an aligned position in response to the second edge in the BEMF signal. Thereafter, the controller 13 ignores the BEMF signal until such time as the controller 13 again commutates the phase winding 7. In the present embodiment, the first edge is a rising edge and the second edge is a falling edge. The controller 13 therefore monitors the BEMF signal and determines that the rotor 5 is at an aligned position in response to a falling edge.

Figure 7:
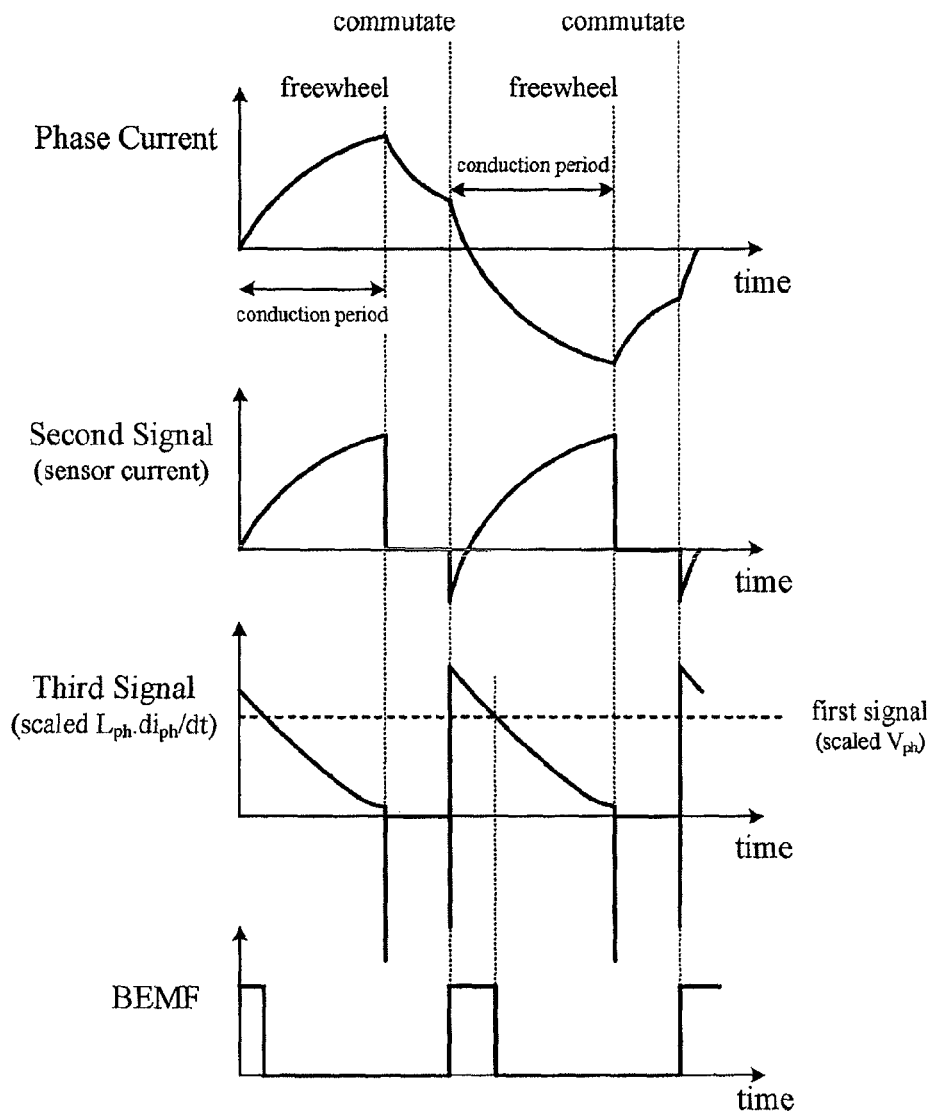
FIG. 7 illustrates various waveforms of the motor system when operating within steady-state mode.

In an attempt to demonstrate the behaviour of the motor system 1, FIG. 7 illustrates possible waveforms for the phase current, the voltage of the second signal, the voltage of the third signal, and the BEMF signal over one electrical cycle. On commutating the phase winding 7, the voltage of the second signal can be seen to change abruptly from zero to a negative value, and then rise sharply to a positive value. As a result, the voltage of the third signal has a negative spike (corresponding to the abrupt change in the voltage of the second signal from zero to a negative value) immediately followed by a positive spike (corresponding to the sharp rise in the voltage of the second signal). The magnitude of the positive spike is such that the voltage of the third signal exceeds that of the first signal and thus a rising edge is generated in the BEMF signal. As the voltage of the third signal decreases, the voltages of the first signal and the third signal again correspond and a falling edge is generated in the BEMF signal.

At noted above, the controller 13 commutates the phase winding 7 in advance of each aligned position of the rotor 5. The reasons for this are as follows. During excitation, the phase voltage, $V_{ph}$, is proportional to the DC link voltage, $V_{Dc}$. During freewheeling, on the other hand, the phase voltage is zero. Consequently, the voltage of the signal output by the voltage sensor 15 is proportional to the phase voltage, $V_{ph}$, only when the phase winding 7 is excited. Additionally, the current sensor 11 provides a measure of the phase current during excitation only. The back EMF sensor 12 is therefore capable of determining the rotor position only when the phase winding 7 is excited. The controller 13 therefore commutates the phase winding 7 in advance of each aligned position of the rotor 5. This then ensures that the phase winding 7 is excited as the rotor 5 passes through each aligned position.

In order to commutate the phase winding 7, the controller 13 acts in response to each falling edge of the BEMF signal. In response to a falling edge of the BEMF signal, the controller 13 subtracts an advance period, T_ADV, from the period of the electrical half-cycle, T_HC, in order to obtain a commutation period, T_COM:

T_COM=T_HC−T_ADV

The controller 13 then commutates the phase winding 7 at a time, T_COM, after the falling edge. As a result, the controller 13 commutates the phase winding 7 in advance of the next aligned position of the rotor 5 by the advance period, T_ADV. The period of the electrical half-cycle, T_HC, is defined by the interval between two successive edges of the BEMF signal.

The advance period defines the phase of excitation (i.e. the angle at which the phase winding 7 is excited relative to aligned positions of the rotor 5) and the conduction period defines the length of excitation (i.e. the angle over which the phase winding 7 is excited). The controller 13 may adjust the advance period and/or the conduction period in response to changes in the speed of the rotor 5. For example, the controller 13 may adjust the advance period and/or the conduction period such that the same input or output power is achieved over a range of rotor speeds.

In the discussion above, it was noted that the resistive term, $i_{ph}R_{ph}$, of the phase voltage equation is negligible around zero-crossings in the back EMF. There are several reasons for this. First, the resistive term is relatively small irrespective of the rotor position. For example, the phase resistance at 70 degrees C. may be 0.03Ω, the voltage of the power supply 2 may be 24 V, and the current limit may be 30 A. Accordingly, when the phase current is at a maximum of 30 A, the $i_{ph}R_{ph}$ term is 0.9 V. The phase voltage on the other hand, is around 24 V. Accordingly, irrespective of the rotor position, the voltage equation for the phase winding 7 is dominated by the inductive and back EMF terms. Second, when operating in steady-state mode, the controller 13 freewheels the phase winding 7 during a period of falling back EMF. Consequently, the phase current has been decaying for a period prior to the zero-crossing in back EMF. Third, the controller 13 commutates the phase winding 7 in advance of zero-crossings in the back EMF. Commutation naturally involves a zero-crossing in the phase current. Since the phase current is generally non-zero prior to commutation, and commutation occurs before a zero-crossing in the back EMF, the zero-crossing in the phase current will occur at or near the zero-crossing in the back EMF. Consequently, the resistive term is negligible at zero-crossings in the back EMF.

Figure 8:
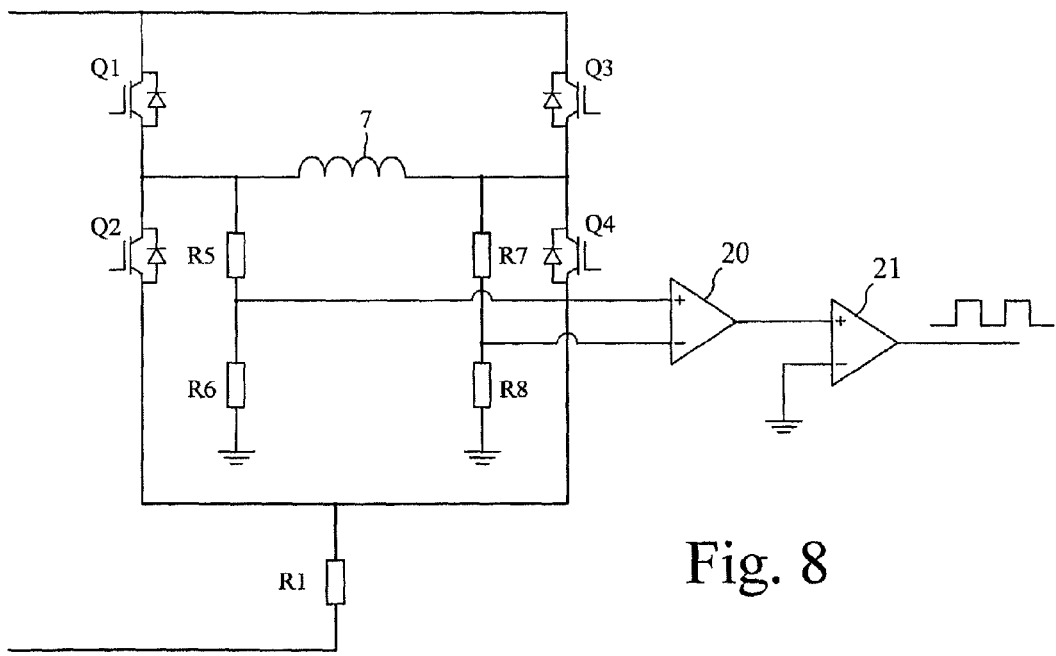
FIG. 8 is a schematic diagram of an alternative back EMF sensor of the motor system.

At the speed threshold, the frequency of current chopping within acceleration mode may be relatively low. As a result, the margin of error in the aligned position determined by the controller 13 may be relatively large. Steady-state mode requires that the phase winding 7 is excited in advance of rotor aligned positions. However, if the error in the determined aligned position is relatively large, it is possible that commutation may occur at or after the rotor aligned position. Accordingly, prior to entering steady-state mode it may be necessary or desirable to establish an aligned position for the rotor 5 with improved accuracy. Accordingly, as illustrated in FIG. 8, the back EMF sensor 12 may comprise a pair of potential dividers R5,R6 and R7,R8, a differential amplifier 20, and a zero-cross detector 21. The outputs of the potential dividers R5,R6,R7,R8 are fed to the amplifier 20, which outputs a measure of the phase voltage. The output of the amplifier 20 is fed to the zero-crossing detector 21, which outputs a digital signal having edges that correspond to zero-crossings in the phase voltage. On transitioning from acceleration mode to steady-state mode, the controller 13 opens all switches Q1-Q4 of the inverter 9 and monitors the signal output by the zero-cross detector 21. With all switches open, the phase current decays through the freewheel diodes of the switches Q1-Q4 until no current flows through the phase winding 7. At this point, the voltage across the phase winding 7 corresponds to the back EMF induced in the phase winding 7. Consequently, each edge of the signal output by the zero-cross detector 21 corresponds to a zero-crossing in the back EMF. The controller 13 therefore obtains a more accurate measure of the rotor aligned position. After a rotor aligned position has been identified (i.e. after an edge in the signal output by the zero-cross detector 21 has been sensed), the controller 13 switches to steady-state mode and controls the motor 3 in the manner described above. In particular, the controller 13 monitors the BEMF signal and commutates the phase winding 7 in response to falling edges in the BEMF signal.

In the embodiment described above, the back EMF sensor 12 is capable of sensing zero-crossings of back EMF during phase excitation only. The controller 13 is therefore required to commutate the phase winding 7 in advance of each zero-crossing in the back EMF. This is not regarded as a problem since, at the relatively high speeds that occur within steady-state mode, advanced commutation is generally required in order to drive sufficient current and thus power into the phase winding 7 over each electrical half-cycle. Nevertheless, there may be instances for which it is desirable to synchronise or retard commutation relative to the zero-crossings of back EMF.

Advanced, synchronised and retarded commutation may all be achieved using the same control scheme as that described above. In response to a falling edge in the BEMF signal, the controller 13 subtracts a phase period, T_PHASE, from the period of the electrical half-cycle, T_HC, in order to obtain the commutation period, T_COM:

$$T\_COM = T\_HC - T\_PHASE$$

The controller 13 then commutates the phase winding 7 at a time, T_COM, after the falling edge. As a result, the controller 13 commutates the phase winding 7 relative to the next rotor aligned position by the phase period, T_PHASE. If the phase period is positive, commutation occurs before the rotor aligned position (advanced commutation). If the phase period is zero, commutation occurs at the rotor aligned position (synchronous commutation). And if the phase period is negative, commutation occurs after the rotor aligned position (retarded commutation).

If synchronised or retarded commutation is employed, rotor aligned positions are likely to occur when the phase winding 7 is freewheeling. An alternative design of current sensor 11 and voltage sensor 15 will therefore be required in order to measure the phase voltage and the phase current during freewheeling as well as excitation.

Figure 9:
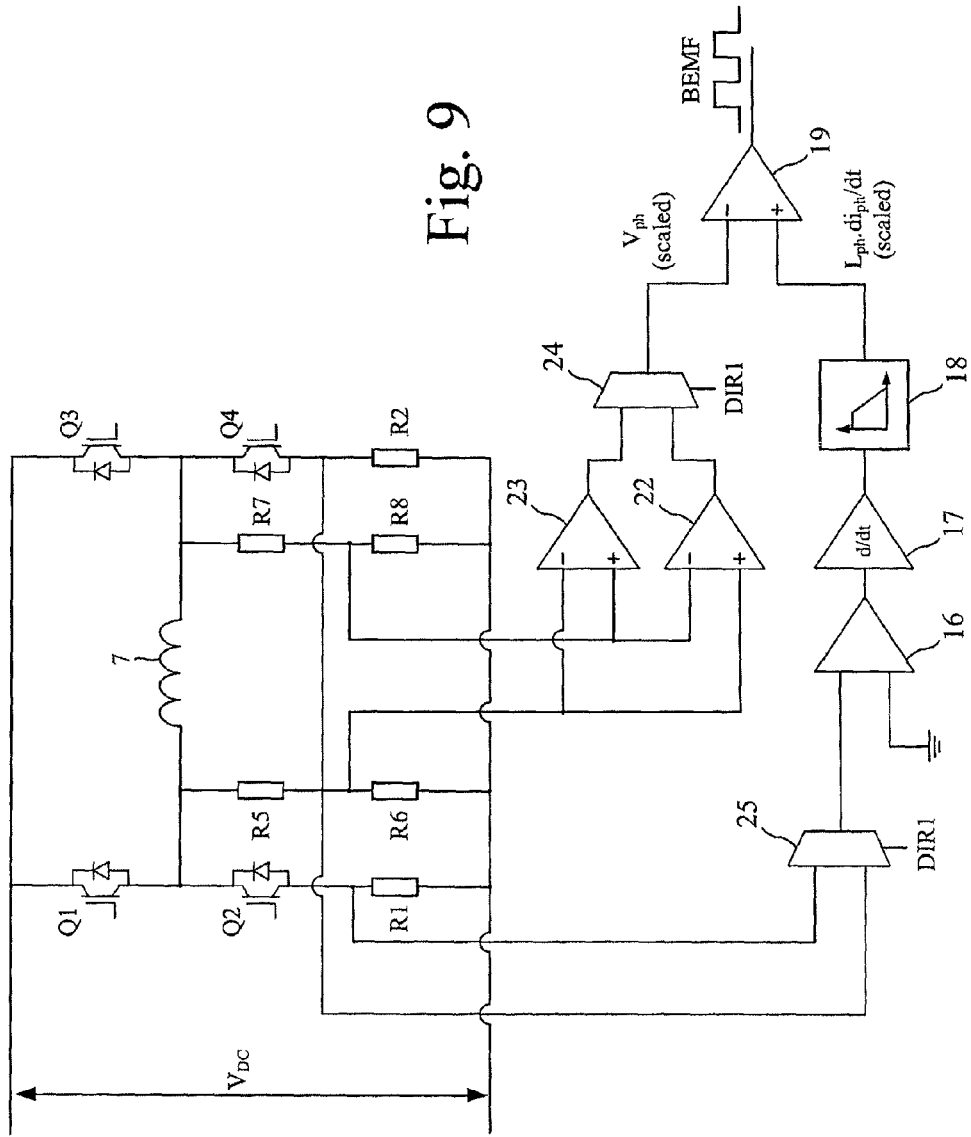
FIG. 9 is a schematic diagram of an alternative motor system in accordance with the present invention.

FIG. 9 illustrates an alternative embodiment in which the current sensor 11 and the voltage sensor 15 are different. In all other respects, the control system 4 is unchanged. In particular, the back EMF sensor 12 continues to comprise an amplifier 16, a differentiator 17, a low-pass filter 18, and a comparator 19.

The current sensor 11 comprises a pair of sense resistors R1 and R2, and a multiplexer 25. Each resistor R1,R2 is located on a lower leg of the inverter 9, with one of the resistors R2 providing a measure of the phase current when excited from left to right, and the other resistor R1 providing a measure of the phase current when excited from right to left. The multiplexer 25 selects one of the two signals output by the sense resistors R1,R2.

The voltage sensor 15 comprises a pair of potential dividers R5,R6 and R7,R8, a pair of differential amplifiers 22,23 and a multiplexer 24. The potential dividers R5,R6 and R7,R8 are located on opposite sides of the phase winding 7, and the outputs of the dividers R5,R6,R7,R8 are fed to both differential amplifiers 22,23. The signal output by one of the amplifiers 22 provides a measure of the phase voltage when excited from left to right, and the signal output by the other amplifier 23 provides a measure of the phase voltage when excited from right to left. The multiplexer 24 selects one of the two signals output by the amplifiers 22,23.

The DIR1 signal output by the controller 13 is used as the selector input for both multiplexers 24,25. Accordingly, the multiplexers 24,25 select one of the amplifiers 22,23 and one of the sense resistors R1,R2 according to the direction of current through the phase winding 7. By locating the potential dividers R5,R6,R7,R8 on opposite sides of the phase winding 7, and by locating the sense resistors R1,R2 on opposite legs of the inverter 9, the phase voltage and the phase current may be sensed during freewheeling as well as excitation.

The back EMF sensor 12 of FIG. 6 is not able to sense the phase current or phase voltage during freewheeling. As a result, spurious edges are generated in the BEMF signal during freewheeling. The back EMF sensor 12 of FIG. 9, on the other hand, is able to sense the phase current and the phase voltage during both excitation and freewheeling. As a result, no spurious edges are generated during freewheeling. Nevertheless, a rising edge continues to be generated in the BEMF signal on commutating the phase winding 7. The rising edge occurs because the current through the selected sense resistor R1 or R2 is initially negative, owing to the inductance of the phase winding. As a result, a negative and then positive spike occurs in the voltage of the third signal. The controller 13 therefore monitors the BEMF signal during excitation and freewheeling and commutates the phase winding 7 at times relative to the falling edges of the BEMF signal.

Figure 10:
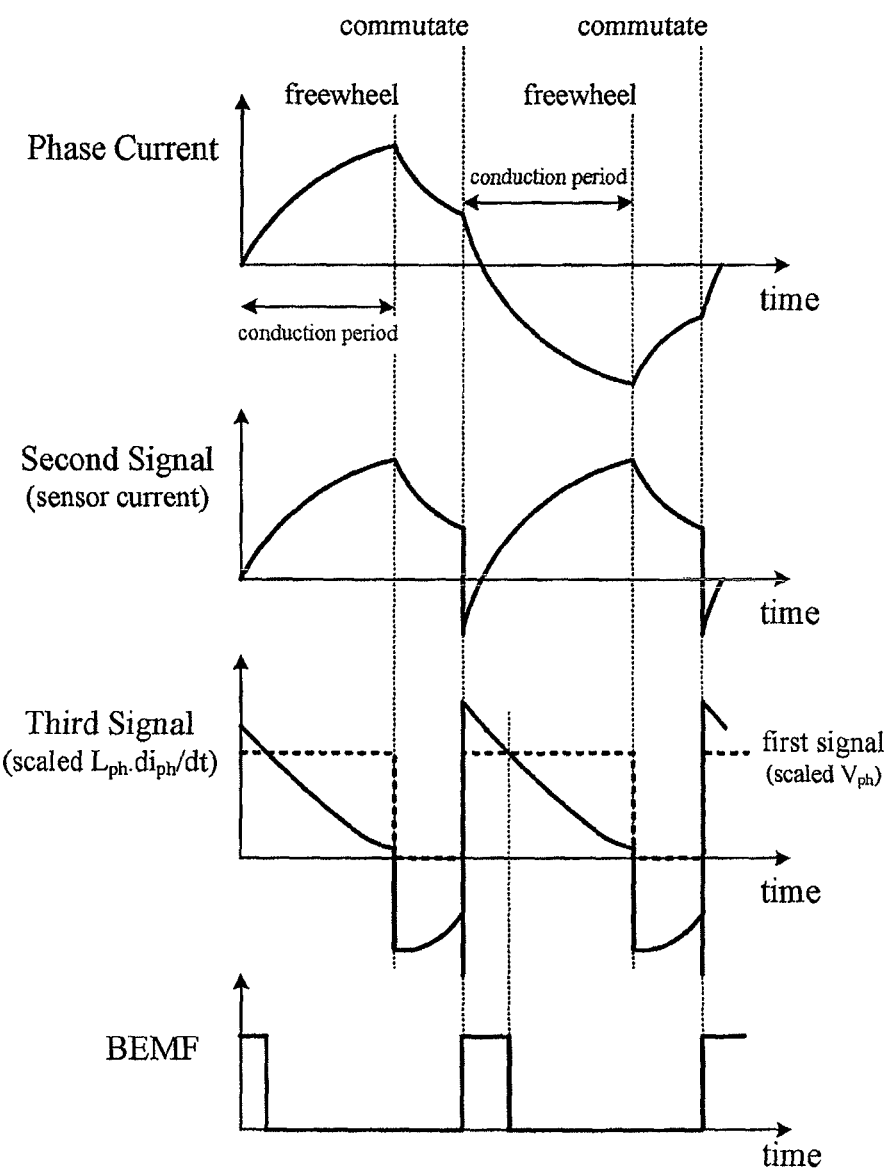
FIG. 10 illustrates various waveforms of the alternative motor system when operating within steady-state mode.

FIG. 10 illustrates waveforms for the phase current, the voltage of the second signal, the voltage of the third signal, and the BEMF signal over one electrical cycle when employing the arrangement of FIG. 9.

Figure 11:
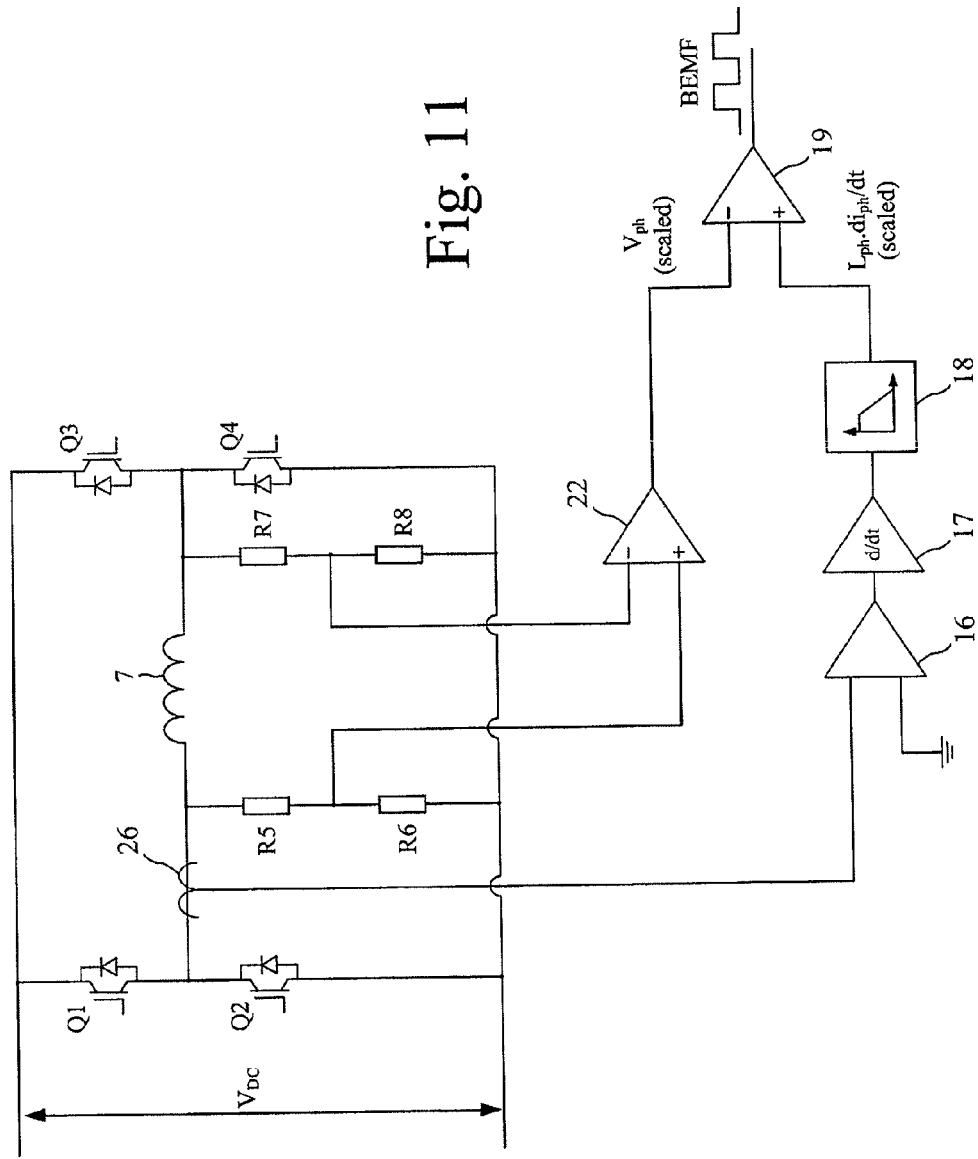
FIG. 11 is a schematic diagram of a further alternative motor system in accordance with the present invention.

FIG. 11 illustrates a further alternative embodiment in which the current sensor 11 and the voltage sensor 15 are again changed.

The current sensor 11 comprises a current transformer 26 that senses the phase current during both excitation and freewheeling. The polarity of the signal output by the current transformer 26 reflects the direction of current through the phase winding 7.

The voltage sensor 15 comprises a pair of potential dividers R5,R6 and R7,R8 located on opposite sides of the phase winding 7, the outputs of which are fed to a single differential amplifier 22. The signal output by the amplifier 22 provides a measure of the phase voltage, with the polarity of the voltage reflecting the direction of excitation, i.e. the phase voltage is positive when the phase winding 7 is excited from left to right, and negative when excited from right to left.

As with the embodiment illustrated in FIG. 9, the current sensor 11 and the voltage sensor 15 sense the phase current and the phase voltage during both excitation and freewheeling. However, in contrast to the embodiment of FIG. 9, the voltage of the signal output by the current sensor 11 does not undergo an abrupt change on commutating the phase winding 7. As will now be explained, this has important implications for the BEMF signal output by the back EMF sensor 12.

Figure 12:
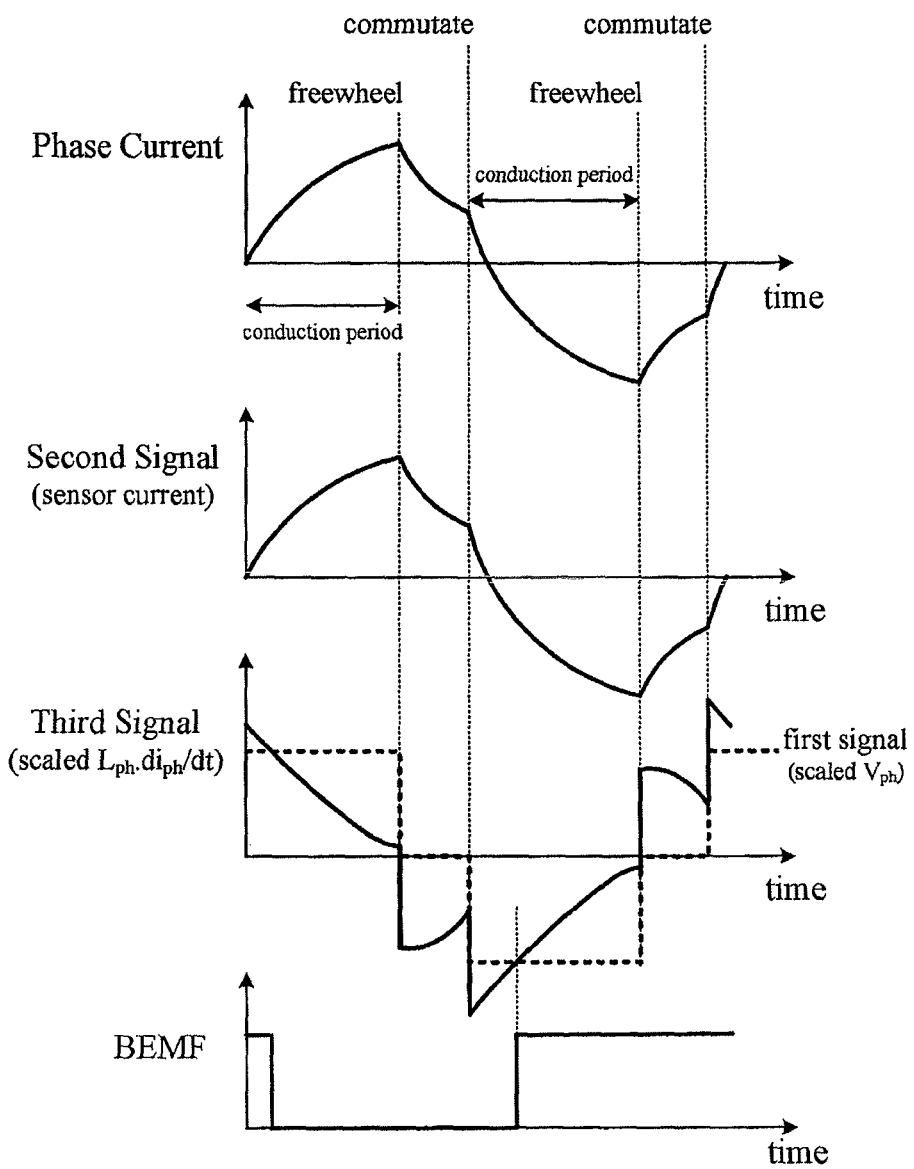
FIG. 12 illustrates various waveforms of the further alternative motor system when operating within steady-state mode.

FIG. 12 illustrates waveforms for the phase current, the voltage of the second signal, the voltage of the third signal, and the BEMF signal over one electrical cycle when employing the arrangement of FIG. 11. It can be seen that the voltage of the second signal output by the current sensor 11 mirrors that of the phase current. In contrast to waveform illustrated in FIG. 10, there are no abrupt changes in the voltage of the second signal at the point of commutation. Consequently, there are no negative spikes in the voltage of the third signal. It may appear from FIG. 12 that the voltages of the first and third signals correspond at the point of freewheeling and at the point of commutation. However, this is not the case. Instead, the voltages of the two signals rise and fall together. Accordingly, the voltages of the two signals do not correspond and no edges are generated in the back EMF signal. Indeed, as is evident from FIG. 12, edges are generated in the BEMF signal only at a zero-crossing in the back EMF, i.e. when $V_{ph}=L_{ph}\cdot di_{ph}/dt$. The BEMF signal therefore resembles the signal output by a conventional Hall-effect sensor.

Particular embodiments have thus far been described for measuring the phase voltage and the phase current. It will be appreciated that other arrangements exist for measuring the voltage and current. By way of example only, the current sensor 11 may comprise a Hall-effect sensor or other current transducer.

In the embodiments described above, the back EMF sensor 12 is distinct from the controller 13 and is implemented in hardware external to the controller 13. Conceivably, however, if the required hardware forms part of the peripherals of the controller 13, one or more components of the back EMF sensor 12 (e.g. the amplifier 16, the differentiator 17, the low-pass filter 18, and/or the comparator 19) may form an integral part of the controller 13.

The low-pass filter 18 of the back EMF sensor 12 may introduce a phase delay into the third signal, which would in turn lead to a phase shift in the BEMF signal. The filter 18 is therefore configured to remove sufficient noise from the third signal with as little phase delay as possible.

Two schemes have thus far been described for sensing the position of the rotor 5. In the first scheme (employed in acceleration mode), the time taken for the phase current to exceed a current limit is used to determine the position of the rotor 5. In the second scheme (employed in steady-state mode), a comparison of the phase voltage and the rate of change of phase current is made in order to determine the position of the rotor 5.

The first scheme has the advantage that it can be implemented without the need for any additional hardware. Indeed, in comparison to a conventional motor system that employs a Hall-effect sensor, the first scheme employs at least one fewer component. When the phase current exceeds the current limit, the phase winding 7 is freewheeled for a freewheel period. It is not therefore necessary to sense the phase current during freewheeling. As a result, the first scheme may be implemented using a single sense resistor to measure the phase current. The first scheme therefore offers a cost-effective method of determining the rotor position.

The first scheme relies on current chopping in order to determine the position of the rotor 5. Moreover, the frequency of current chopping determines the resolution and thus the accuracy with which the rotor position is determined. Consequently, when current chopping is relatively infrequent (e.g. at relatively high speeds), the accuracy of the determined rotor position may be relatively poor. The second scheme has the advantage that it does not rely on current chopping in order to determine the position of the rotor 5. Consequently, a determination of the rotor position may be made irrespective of rotor speed. The accuracy of the determined rotor position is defined partly by the resistive term, $i_{ph}R_{ph}$. Fortunately, the resistive term is typically small and can often be neglected. Moreover, even if the resistive term may be said to be significant, the term simply increases the error in the determined aligned position. It nevertheless continues to be possible to determine an aligned position for the rotor. A disadvantage with the second scheme lies in the additional hardware that is required to implement the scheme, which naturally increases the cost of the motor system 1. Nevertheless, the increase in component cost may be offset by the reduction in assembly cost as a result of omitting the Hall-effect sensor.

The cost of implementing the second scheme can be kept relatively low by employing a single potential divider R3,R4 for the voltage sensor 15 and a single sense resistor R1 for the current sensor 11, as illustrated in FIG. 6. In employing a single potential divider R3,R4 and single sense resistor R1, the position of the rotor 5 can be sensed only when the phase winding 7 is excited. This is achieved by commutating the phase winding 7 in advance of rotor aligned positions. At relatively low speeds, the phase current rises relatively quickly to the current limit. It is therefore possible that a zero-crossing in the back EMF may occur at a time when the phase winding 7 is freewheeling. Accordingly, this particular implementation of the second scheme, whilst cost-effective, may be unsuitable at relatively low speeds. However, by employing the first scheme at lower speeds and the second scheme at higher speeds, a cost-effective solution is obtained for controlling the motor 3 over the full range of rotor speeds.

The power supply 2 may output a voltage that varies with time. For example, the power supply 2 may comprise a battery that discharges with use. Alternatively, the power supply 2 may comprise an AC source and rectifier that provide a rectified voltage. Depending on the capacitance of the DC link filter 8, the DC link voltage may have a relatively high ripple. Alternatively, the DC link filter 8 may smooth the rectified voltage but the RMS voltage of the AC source may drift with time. The rate at which current rises in the phase winding 7 depends on the magnitude of the phase voltage. Accordingly, when employing the first sensorless scheme, any changes in the voltage of the power supply 2 may affect the point at which an aligned position is determined by the controller 13. For example, as the voltage of the power supply 2 increases, the rate at which phase current rises increases and thus the length of the current-rise period decreases. If the same current-rise threshold is employed, changes in the voltage of the power supply 2 may cause the aligned position to be determined at an earlier point (if the voltage increases) or at a later point (if the voltage decreases). Accordingly, the controller 13 may adjust the rise-time threshold in response to changes in the voltage of the power supply 2. In particular, the controller 13 may decrease the rise-time threshold in response to an increase in the phase voltage, and vice versa. As a result, the aligned position may be determined with improved accuracy over a range of voltages.

In addition to adjusting the rise-time threshold, the controller 13 may also adjust the freewheel period in response to changes in the voltage of the power supply 2. For example, if the voltage of the power supply 2 decreases, the phase current will rise at a slower rate during excitation and thus the frequency of current chopping will decrease. To compensate for this, a shorter freewheel period may be employed. More generally, the controller 13 may adjust the current limit and/or the freewheel period in response to changes in rotor speed and/or supply voltage so as to better shape the phase-current waveform, thereby increasing the power and/or efficiency of the motor system 1.

The controller 13 may also employ a speed threshold that depends on the voltage of the power supply 2. When employing the first sensorless scheme, the accuracy of the aligned position depends on the frequency of current chopping. As the voltage of the power supply 2 decreases, the phase current rises at a slower rate and thus the frequency of current chopping decreases. At relatively low speeds, the frequency of current chopping is relatively high and thus a decrease in the voltage of the power supply 2 is unlikely to influence greatly the accuracy of the aligned position. However, at relatively high speeds where the frequency of current chopping is relatively low, a decrease in the voltage of the power supply may adversely affect the accuracy of the aligned position. Accordingly, for a lower supply voltage, it may be desirable to switch to the second sensorless scheme at a lower speed. When employing the second sensorless scheme, or rather the particular embodiment illustrated in FIGS. 6 and 7, the position of the rotor 5 can be determined during phase excitation only. The controller 13 therefore commutates the phase winding 7 in advance of each aligned position so as to ensure that the phase winding 7 is excited as the rotor 5 passes through the aligned position. However, the controller 13 freewheels the phase winding 7 whenever current in the phase winding 7 exceeds the current limit. It is therefore important that the phase current does not exceed the current limit before the rotor 5 reaches the aligned position. The speed threshold and the advance period are therefore chosen such that, for a nominal supply voltage, the phase current does not exceed the current limit until after the rotor 5 has passed through the aligned position. If, however, the voltage of the power supply 2 were to increase, the phase current would rise at a faster rate and thus the current limit would be reached at an earlier point in time. Conceivably, the phase current may exceed the current limit before the rotor 5 has reached the aligned position. Accordingly, for a higher supply voltage, it may be desirable to switch to the second sensorless scheme at a higher speed, where the magnitude of the back EMF will be higher. Both the sensorless schemes can therefore benefit from a speed threshold that depends on the magnitude of the supply voltage. Accordingly, the controller 13 may employ a speed threshold that depends on the magnitude of the supply voltage. More particularly, the controller 13 may employ a lower speed threshold for a lower supply voltage.

The first sensorless scheme described above uses the current-rise period to determine the position of the rotor 5. However, the applicant has found that the magnitude of the phase current at the end of each freewheel period may also be used to determine the position of the rotor 5. As noted above, the controller 13 freewheels the phase winding 7 whenever current in the phase winding 7 exceeds a current limit. The controller 13 freewheels the phase winding 7 for a predetermined freewheel period, during which time current in the phase winding 7 decays. During each freewheel period, the back EMF induced in the phase winding 7 acts in opposition to the direction of current in the phase winding 7. The rate at which the phase current decays therefore depends on the magnitude of the back EMF. Consequently, the magnitude of the phase current at the end of each freewheel period depends on the magnitude of back EMF in the phase winding 7. The magnitude of the back EMF induced in the phase winding 7 depends on, among other things, the angular position of the rotor 5. Accordingly, the magnitude of the phase current at the end of each freewheel period may be used to determine the position of the rotor 5.

The waveform of the back EMF is typically sinusoidal (as illustrated in FIGS. 4 and 5) or trapezoidal, with zero-crossings in the back EMF occurring at aligned positions of the rotor 5. Consequently, as the rotor 5 approaches an aligned position, the magnitude of the back EMF decreases and thus the magnitude of the phase current at the end of each freewheel period increases. This behaviour may then be exploited by the controller 13 in order to determine the position of the rotor 5. In particular, the controller 13 may measure the magnitude of the phase current at the end of each freewheel period and compare this against a current threshold. When the phase current exceeds the current threshold, the controller 13 determines that the rotor 5 is at an aligned position.

Figure 13:
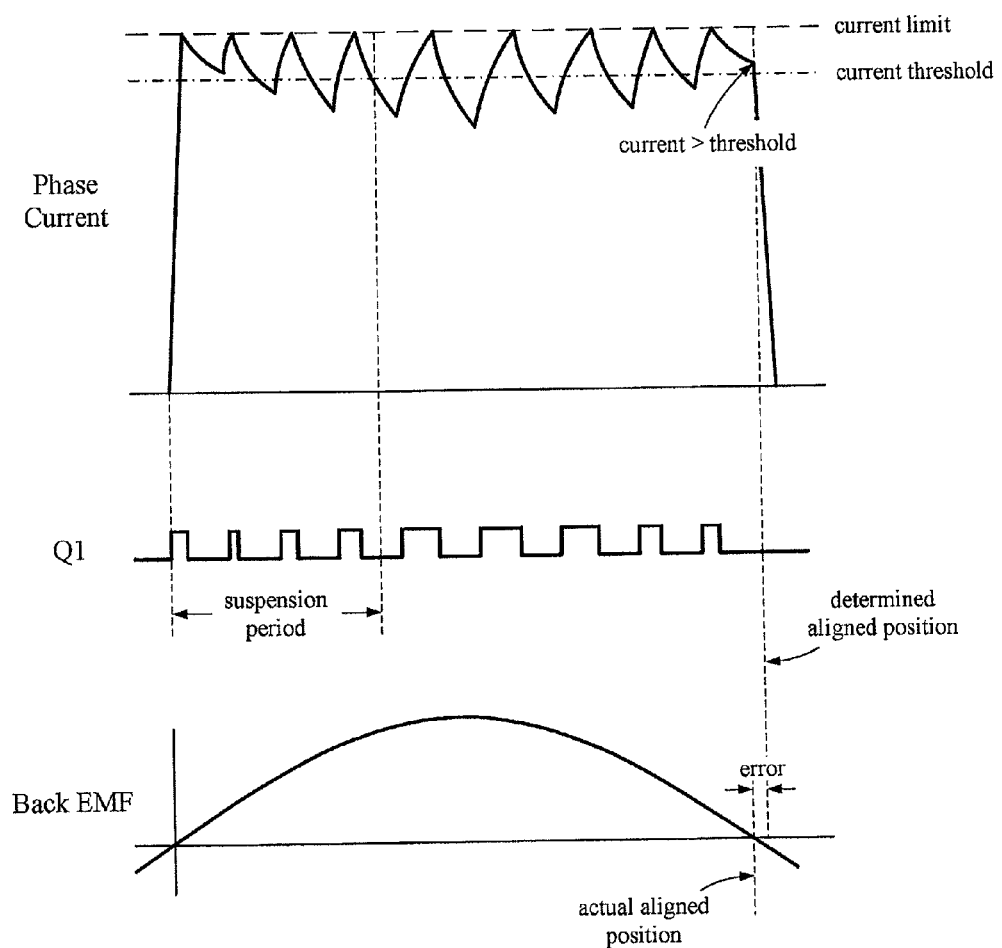
FIG. 13 illustrates various waveforms of a still further motor system in accordance with the present invention when operating at a relatively low speed within acceleration mode.

FIG. 13 illustrates waveforms for the phase current, the on/off signal for power switch Q1, and the back EMF over one electrical half-cycle when employing this alternative method of implementing the first sensorless scheme. The waveforms correspond to those of FIG. 4, with the exception that the position of the rotor 5 is determined using the magnitude of the phase current at the end of each freewheel period rather than the current-rise period.

When the current-rise period is used to determine the rotor position, the value chosen for the current-rise threshold influences the accuracy of the aligned position determined by the controller 13. Likewise, when the magnitude of the phase current at the end of the freewheel period is used to determine the rotor position, the value chosen for the current threshold influences the accuracy of the determined aligned position. In particular, if the current threshold is set too low, the controller 13 is likely to determine an aligned position for the rotor 5 at an earlier point. Conversely, if the current threshold is set too high, the controller 13 is likely to determine an aligned position for the rotor 5 at a later point.

As the rotor speed increases, the frequency of current chopping decreases. Additionally, the magnitude of the back EMF increases and thus the phase current decays at a faster rate during each freewheel period. Accordingly, when the rotor 5 is at or near the aligned position, the magnitude of the phase current at the end of the freewheel period is likely to be lower at higher rotor speeds. This can be seen, for example, in FIGS. 4 and 5 where the rotor speed is respectively lower and higher. If the same current threshold were employed irrespective of rotor speed, the controller 13 would most likely determine that the rotor 5 is at the aligned position at an earlier point when operating at lower rotor speeds and a later point when operating at higher rotor speeds. Accordingly, in order to improve the accuracy of the determined aligned position, the controller 13 may employ a current threshold that varies with rotor speed. In particular, the controller 13 may employ a current threshold that decreases with increasing rotor speed. Consequently, at lower speeds, where the frequency of current chopping is relatively high, a higher current threshold may be used. Conversely, at higher speeds, where the frequency of current chopping is relatively low, a lower current threshold may be used. As a result, the aligned position may be determined with improved accuracy over a range of rotor speeds.

Two different methods are therefore available for implementing the first sensorless scheme. In the first, the current-rise period is used to determine the position of the rotor. In the second, the magnitude of the phase current at the end of the freewheel period is used to determine the rotor position. Accordingly, in a more general sense, the first sensorless scheme may be said to comprise sequentially exciting and freewheeling the phase winding. The winding is freewheeled for a predetermined freewheel period in response to current in the winding exceeding a current limit. A parameter is then measured that corresponds to either the current-rise period or the magnitude of the phase current at the end of the freewheel period. The measured parameter is then compared against a threshold, and the rotor is determined to be at an aligned position when the measured parameter is less than the threshold (e.g. when the current-rise period is less than the rise-time threshold) or greater than the threshold (e.g. when the magnitude of phase current is greater than the current threshold).

The first sensorless scheme exploits the finding that the current-rise period decreases and the magnitude of the phase current at the end of the freewheel period increases as the rotor 5 approaches the aligned position. The applicant has also found that the current-rise period is at a maximum and the magnitude of the phase current at the end of the freewheel period is at a minimum when the rotor 5 is at or near the midpoint between the unaligned and aligned positions. Accordingly, rather than determining that the rotor 5 is at the aligned position when the current-rise period is less than a rise-time threshold or when the phase current at the end of the freewheel period is greater than a current threshold, the controller 13 may instead determine that the rotor 5 is at the midpoint position when the current-rise period is greater than a rise-time threshold or when the phase current at the end of the freewheel period is less than a current threshold. Accordingly, in a more general sense, the controller 13 may be said to determine that the rotor 5 is at a predetermined position when the measured parameter is less than or greater than a threshold.

Through appropriate selection of the rise-time threshold or the current threshold, any predetermined position for the rotor 5 may be determined by the controller 13. For example, let us say that the controller 13 determines that the rotor 5 is at a particular position when the current-rise period is less than the rise-time threshold. By increasing the rise-time threshold, the rotor position will be determined at an earlier point. Conversely, by decreasing the rise-time threshold, the rotor position will be determined at a later point. The value of the rise-time threshold or the current threshold may therefore be defined such that the compare operation (i.e. is the measured parameter less than or greater than the threshold) is satisfied for a particular predetermined position of the rotor 5. Moreover, the value of the threshold may be defined so as to control the commutation point for the phase winding 7. For example, let us say that the controller 13 commutates the phase winding 7 immediately on determining that the current-rise period is less than the rise-time threshold. Moreover, let us say that the value of the rise-time threshold is defined initially such that current-rise period is less than the rise-time threshold when the rotor 5 is at the aligned position. By increasing the value of the rise-time threshold, the current-rise period will be less than the rise-time threshold at an earlier point and thus the controller 13 will commutate the phase winding 7 before the aligned position, i.e. advanced commutation. Conversely, by decreasing the value of the rise-time threshold, the current-rise period will be less than the rise-time threshold at later point and thus the controller 13 will commutate the phase winding 7 after the aligned position, i.e. retarded commutation. Accordingly, advanced, synchronous or retarded commutation may be achieved through appropriate selection of the rise-time threshold or the current threshold. This then has the advantage that the commutation point may be set without the need to calculate the commutation period, T_COM, or employ a dedicated timer to measure the commutation period.

Two different methods have thus far been described for implementing the first sensorless scheme. In each, the controller 13 excites the phase winding 7 until the phase current exceeds a current limit, in response to which the controller 13 freewheels the phase winding 7 for a predetermined freewheel period. Two further methods for implementing the first sensorless scheme will now be described. In a third method, the controller 13 abandons the use of a predetermined freewheel period and instead employs an upper current limit and a lower current limit. The controller 13 then excites the phase winding 7 until the phase current rises to the upper current limit, at which point the controller 13 freewheels the phase winding 7. Freewheeling then continues until the phase current decays to the lower current limit, at which point the controller 13 again excites the phase winding 7. The controller 13 then measures the time taken for the phase current to rise from the lower current limit to the upper current limit or fall from the upper current limit to the lower current limit. As noted above, the magnitude of the back EMF in the phase winding 7 influences the rate at which the phase current rises during excitation and falls during freewheeling. Accordingly, the time taken for the phase current to rise to the upper current limit or fall to the lower current limit will depend on the angular position of the rotor 5. The controller 13 then compares the measured time against a threshold and determines that the rotor 5 is at a predetermined position when the measured time is less than or greater than the threshold. For example, the controller 13 may determine that the rotor 5 is at an aligned position when the measured time is less than the threshold. In a fourth method, the controller 13 initially excites the phase winding 7 until the phase current exceeds the current limit. The controller 13 then freewheels the phase winding 7 for a predetermined freewheel period or until the phase current falls to a lower current limit. At the end of freewheeling, the controller 13 again excites the phase winding 7. However, rather than exciting the phase winding 7 until such time as the phase current exceeds the current limit, the controller 13 instead excites the phase winding 7 for a predetermined excitation period. At the end of the excitation period, the controller 13 measures the magnitude of the phase current and compares this against a threshold. Since the magnitude of the back EMF in the phase winding 7 influences the rate at which the phase current rises during excitation, the magnitude of the phase current at the end of the excitation period will depend on the angular position of the rotor 5. The controller 13 then determines that the rotor 5 is at a predetermined position when the measured phase current is less than or greater than the threshold. For example, the controller 13 may determine that the rotor 5 is at an aligned position when the measured phase current is greater than the threshold. A disadvantage of this fourth method is that the magnitude of the phase current at the end of each excitation period is poorly controlled. As a result, the phase current could potentially rise to a level that damages components of the motor system 1. However, this problem may be mitigated by having a relatively short excitation period.

Several methods are therefore available for implementing the first sensorless scheme. Irrespective of the method, the first sensorless scheme involves sequentially exciting and freewheeling the phase winding 7. A parameter is then measured at the start or end of freewheeling. This parameter depends on the rate of change of current in the phase winding 7 during excitation or freewheeling. For example, the parameter may be the magnitude of the phase current at the start or end of freewheeling, or the parameter may be the time required for the phase current to rise to an upper current limit during excitation or fall to a lower current limit during freewheeling.

The second sensorless scheme generates an edge in the BEMF signal whenever the voltages of the first and third signals correspond. In the embodiment described above, the two signals are scaled such that the voltages correspond whenever there is a zero-crossing in the back EMF, i.e. when the rotor 5 is at an aligned position. However, the signals may be scaled such that the voltages correspond at a different point in the back EMF waveform and thus at a different rotor position. For example, in the example illustrated in FIG. 7, increasing the voltage of the first signal will cause the falling edge to be generated at an earlier point. Conversely, decreasing the voltage of the first signal will cause the falling edge to be generated at a later point.

Consequently, through appropriate scaling of the two signals, the voltages of the two signals may be made to correspond when the rotor 5 is at a particular predetermined position.

The second sensorless scheme assumes that the resistive term, $i_{ph}R_{ph}$, is relatively small and may be ignored. If need be, however, the resistive term may be taken into account. For example, the back EMF sensor 12 may comprise an amplifier or other hardware for scaling the signal output by current sensor 11 to generate a fourth signal having a voltage that is proportional to $i_{ph}R_{ph}$. The back EMF sensor 12 may further comprise a summing amplifier or other hardware that sums the voltages of the third signal ($L_{ph}di_{ph}/dt$) and the fourth signal ($i_{ph}R_{ph}$) to generate a fifth signal having a voltage that is proportional to $i_{ph}R_{ph}+L_{ph}di_{ph}/dt$. The comparator 19 then compares the voltages of the first signal ($V_{ph}$) and the fifth signal ($i_{ph}R_{ph}+L_{ph}di_{ph}/dt$), and an edge is generated in the output signal whenever $V_{ph}=i_{ph}R_{ph}+L_{ph}\cdot di_{ph}/dt$. Accordingly, in a more general sense, the second sensorless scheme may be said to comprise generating a signal having a voltage that is proportional to $V_{ph}$, and generating a further signal having a voltage that depends on $di_{ph}/dt$. The resistive term, $i_{ph}R_{ph}$, may be ignored, in which case the voltage of the further signal is proportional to $L_{ph}\cdot di_{ph}/dt$. Alternatively, the resistive term may be taken into account, in which case the voltage of the further signal is proportional to $i_{ph}R_{ph}+L_{ph}di_{ph}/dt$. The voltages of the two signals are then compared and a predetermined position of the rotor is determined when the two voltages correspond.

In the embodiments described above, the controller 13 generates three control signals (DIRT, DIR2 and FW#) for controlling the power switches Q1-Q4 of the inverter 9. It will be appreciated that other schemes may be employed for controlling the power switches Q1-Q4. By way of example, the processor of the controller 13 may generate a switching signal S1-S4 for each of the four power switches Q1-Q4. Hardware internal or external to the controller 13 may then generate a current-limit signal that is logically high whenever the phase current exceeds the current limit. The current-limit signal takes precedence over the switching signals such that, irrespective of the states of switching signals S1-S4, the high-side switches Q1,Q3 are opened in response to a logically high current-limit signal. Employing hardware to generate the current-limit signal has the advantage that the control system 4 is able to respond relatively quickly to a current-limit event.

In the embodiments described above, freewheeling involves opening the high-side switches Q1,Q3 and allowing current in the phase winding 7 to re-circulate around the low-side loop of the inverter 9. Conceivably, freewheeling might instead involve opening the low-side switches Q2,Q4 and allowing current to re-circulate around the high-side loop of the inverter 9. Accordingly, in a more general sense, freewheeling should be understood to mean that zero volts are applied to the phase winding 7. In the embodiment illustrated in FIG. 9, freewheeling around the high-side loop of the inverter 9 is undesirable. This is because the sense resistors R1,R2 of the current sensor 11 must then be located on the upper legs of the inverter 9. As a result, the voltage across each sense resistor R1,R2 will be floating, making measurement of the phase current difficult.

Reference has thus far been made to a motor system 1 having a single-phase, four-pole motor 3. However, the control system 4 might equally be used to drive a motor 3 having a fewer or greater number of poles. A single-phase motor 3 has the advantage that a relatively simple and thus cheap control system 4 may be employed to control the motor 3. Existing sensorless schemes for controlling a single-phase motor generally suspend excitation at points in the electrical cycle for which zero-crossings in back EMF are expected. As a result, the electrical power driven into the motor is significantly reduced. Additionally, the efficiency of the motor may be reduced and/or the torque ripple may be increased. In contrast, the sensorless schemes described above are capable of sensing the position of the rotor whilst exciting the phase winding. As a result, either scheme may be used to control a single-phase motor without adversely affecting the electrical power, efficiency or torque ripple.

Although the sensorless schemes described above have particular benefits when employed in a single-phase motor, either scheme may be employed in a multi-phase motor. For a multi-phase motor, there will be periods where a particular phase winding is not excited. Accordingly, where the sensorless scheme relies on phase excitation in order to sense the position of the rotor, it will be necessary to switch current sensing from one phase winding to another.

The invention claimed is:

1. A method of controlling a brushless permanent-magnet motor, the method comprising:
   generating a first signal having a voltage that is proportional to a voltage across a winding of the motor;
   generating a second signal having a voltage that is proportional to a current in the winding;
   differentiating the second signal to generate a third signal;
   comparing the voltages of the first signal and the third signal;
   generating an output signal in response to the comparison, wherein edges are generated in the output signal when the voltage of the first signal corresponds to the voltage of the third signal; and
   commutating the winding at times relative to the edges in the output signal.

2. The method of claim 1, wherein the voltages of the first signal and the third signal correspond in response to a zero-crossing in back EMF induced in the winding.

3. The method of claim 1, wherein the voltages of the first signal and the third signal correspond in response to commutating the winding, and the method comprises ignoring edges generated in response to commutating the winding.

4. The method of claim 1, wherein the method comprises exciting and freewheeling the winding, commutating the winding at times relative to edges generated during excitation, and ignoring edges generated during freewheeling.

5. The method of claim 1, wherein the method comprises exciting and freewheeling the winding, and generating the first and second signals during both excitation and freewheeling.

6. The method of claim 1, wherein the method comprises exciting the winding with an excitation voltage, and generating the first signal comprises generating a signal having a voltage that is proportional to the excitation voltage.

7. A control system for a brushless permanent-magnet motor, the control system performing a method comprising:
   generating a first signal having a voltage that is proportional to a voltage across a winding of the motor;
   generating a second signal having a voltage that is proportional to a current in the winding;
   differentiating the second signal to generate a third signal;
   comparing the voltages of the first signal and the third signal;
   generating an output signal in response to the comparison, wherein edges are generated in the output signal when the voltage of the first signal corresponds to the voltage of the third signal; and commutating the winding at times relative to the edges in the output signal.

8. A control system for a brushless permanent-magnet motor, the control system comprising:
- a first sensor generating a first signal having a voltage that is proportional to a voltage across a winding of the motor;
- a second sensor generating a second signal having a voltage that is proportional to a current in the winding;
- a differentiator differentiating the second signal and generating in response a third signal;
- a comparator comparing the voltages of the first signal and the third signal and generating in response an output signal, wherein edges are generated in the output signal when the voltage of the first signal corresponds to the voltage of the third signal; and
- a controller generating one or more control signals for commutating the winding at times relative to the edges in the output signal.

9. The control system of claim 8, wherein the voltages of the first signal and the third signal correspond in response to a zero-crossing in back EMF induced in the winding.

10. The control system of claim 8, wherein the voltages of the first signal and the third signal correspond in response to commutating the winding, and the controller ignores edges generated in response to commutating the winding.

11. The control system of claim 8, wherein the controller generates control signals for exciting and freewheeling the winding, and the controller generates control signals for commutating the winding in response to edges generated during excitation and ignores edges generated during freewheeling.

12. The control system of claim 8, wherein the control system comprises an inverter to which the winding is coupled, and the first sensor comprises a single potential divider located across the inverter.

13. The control system of claim 8, wherein the control system comprises an inverter to which the winding is coupled, the first sensor comprises a pair of potential dividers located on opposite sides of the winding, and the second sensor comprises one of a current transducer, a current transformer and a pair of sense resistors located on opposite legs of the inverter.

14. A motor system comprising a brushless permanent-magnet motor and a control system as claimed in any one of claim 7 or 8, wherein the motor comprises a single phase winding.

* * * * *